(12) United States Patent
Kondo et al.

(10) Patent No.: US 8,272,006 B2
(45) Date of Patent: Sep. 18, 2012

(54) INFORMATION SIGNAL PROCESSING APPARATUS, METHOD OF CREATING DATABASE, METHOD OF PROCESSING INFORMATION SIGNAL, AND PROGRAM FOR IMPLEMENTING METHOD OF PROCESSING INFORMATION SIGNAL

(75) Inventors: Tetsujiro Kondo, Tokyo (JP); Kazutaka Ando, Kanagawa (JP); Takeyuki Fujii, Tokyo (JP); Toru Miyake, Tokyo (JP); Toru Nakagawa, Tokyo (JP); Yusuke Kajio, Tokyo (JP)

(73) Assignee: Sony Corporation, Tokyo (JP)

( * ) Notice: Subject to any disclaimer, the term of this patent is extended or adjusted under 35 U.S.C. 154(b) by 1157 days.

(21) Appl. No.: 12/108,028

(22) Filed: Apr. 23, 2008

(65) Prior Publication Data

US 2008/0316360 A1 Dec. 25, 2008

(30) Foreign Application Priority Data

Jun. 22, 2007 (JP) ................................. 2007-165461

(51) Int. Cl.
*H04N 5/14* (2006.01)
*G06F 17/30* (2006.01)
(52) U.S. Cl. ......................................................... 725/13
(58) Field of Classification Search .................. None
See application file for complete search history.

(56) References Cited

U.S. PATENT DOCUMENTS

| 6,987,539 B2 | 1/2006 | Kondo et al. |
| 2005/0084233 A1* | 4/2005 | Fujii et al. ........................ 386/37 |
| 2005/0108406 A1* | 5/2005 | Lee et al. ........................ 709/228 |
| 2006/0028581 A1 | 2/2006 | Kondo et al. |

FOREIGN PATENT DOCUMENTS

| JP | 8-51599 | 2/1996 |
| JP | 8-123385 | 5/1996 |
| JP | 2000-259307 | 9/2000 |
| JP | 2001-238185 | 8/2001 |
| JP | 2001-298677 | 10/2001 |
| JP | 2003-319366 | 11/2003 |
| JP | 2005-033600 | 2/2005 |
| JP | 2005-94154 | 4/2005 |
| JP | 2005-094154 | 4/2005 |
| JP | 2006-186920 | 7/2006 |
| JP | 2007-036789 | 2/2007 |

OTHER PUBLICATIONS

Office Action issued May 22, 2012 in Japanese Patent Application No. 2007-165461.

* cited by examiner

*Primary Examiner* — Vivek Srivastava
*Assistant Examiner* — Rong Le
(74) *Attorney, Agent, or Firm* — Oblon, Spivak, McClelland, Maier & Neustadt, L.L.P.

(57) ABSTRACT

Disclosed is an information signal processing apparatus. The information signal processing apparatus includes an adjustment unit by which users each adjust an inputted information signal so that an output of the information signal has a predetermined quality, and a storage unit that stores operation information having a final adjustment value of a series of adjustments carried out by the adjustment unit, and history information relating to a sequence of changes to an adjustment value up to the final adjustment value in a storage medium in association with preference information of the user during the series of adjustments.

10 Claims, 19 Drawing Sheets

| USER GROUP | OPERATION SEQUENCE PATTERN | PREFERENCE INFORMATION |
|---|---|---|
| A | PATTERN A | "I HAVE NOTICED A DIFFERENCE IN NOISE" |
|   | PATTERN B | "I HAVEN'T NOTICED A CHANGE IN IMAGE QUALITY" |
|   | PATTERN C | "I WANTED TO SEE A SOFTER IMAGE" |
|   | PATTERN D | "I HAVE FELT HAPPY" |
|   | : | : |
| B | PATTERN A | "I HAVEN'T NOTICED A CHANGE IN IMAGE QUALITY" |
|   | PATTERN B | "I HAVE FELT HAPPY" |
|   | PATTERN C | "I HAVE NOTICED A DIFFERENCE IN NOISE" |
|   | PATTERN D | "I HAVE FELT DOWN" |
|   | : | : |
| : | : | : |

FIG. 13

| USER GROUP | OPERATION SEQUENCE PATTERN | PREFERENCE INFORMATION |
|---|---|---|
| A | PATTERN A | "I HAVE NOTICED A DIFFERENCE IN NOISE" |
| | PATTERN B | "I HAVEN'T NOTICED A CHANGE IN IMAGE QUALITY" |
| | PATTERN C | "I WANTED TO SEE A SOFTER IMAGE" |
| | PATTERN D | "I HAVE FELT HAPPY" |
| | ... | ... |
| B | PATTERN A | "I HAVEN'T NOTICED A CHANGE IN IMAGE QUALITY" |
| | PATTERN B | "I HAVE FELT HAPPY" |
| | PATTERN C | "I HAVE NOTICED A DIFFERENCE IN NOISE" |
| | PATTERN D | "I HAVE FELT DOWN" |
| | ... | ... |
| ... | | |

INFORMATION SIGNAL PROCESSING APPARATUS, METHOD OF CREATING DATABASE, METHOD OF PROCESSING INFORMATION SIGNAL, AND PROGRAM FOR IMPLEMENTING METHOD OF PROCESSING INFORMATION SIGNAL

CROSS REFERENCES TO RELATED APPLICATIONS

The present invention contains subject matter related to Japanese Patent Application JP 2007-165461 filed in the Japanese Patent Office on Jun. 22, 2007, the entire contents of which being incorporated herein by reference.

BACKGROUND OF THE INVENTION

1. Field of the Invention

The present invention relates to an information signal processing apparatus, a method of creating a database, a method of processing an information signal, and a program for causing a computer to implement a method of processing an information signal. More specifically, the present invention relates to a technology that can effectively use a final adjustment value in a series of adjustments when a user carries out adjustment of an inputted information signal to achieve a predetermined quality of an output of the information signal.

2. Description of the Related Art

In recent years, increased interest in audio-visual equipment has led to demand for the development of television receivers that can produce images of higher resolution. In response to such demand, so-called "hi-vision" has been developed. Hi-vision uses 1,125 scan lines that are over double the 525 scan lines used for NTSC standard. Hi-vision also uses a 16:9 aspect ratio instead of the 4:3 aspect ratio used for NTSC standard. This means that compared to NTSC standard, hi-vision can display more lifelike images with a higher resolution.

Although Hi-vision has such superior characteristics, it may not be possible to display hi-vision images when an NTSC-standard signal is directly supplied without conversion. NTSC standard and hi-vision are different standards as described above.

Accordingly, Japanese Unexamined Patent Application Publication No. H08-51599 has disclosed a conversion apparatus for converting an NTSC-standard video signal to a hi-vision video signal so that images provided as an NTSC-standard video signal can be displayed according to hi-vision.

In this conversion apparatus, pixel data of a block (region) corresponding to pixel data of a focus position in a hi-vision video signal is selected from an NTSC-standard video signal, a class to which pixel data of the focus position belongs is determined based on a level distribution pattern of the pixel data in such block, and pixel data of the focus position is generated corresponding to the class.

In the conversion apparatus described earlier, the resolution of images in a hi-vision video signal is fixed, and it has not been possible to set the user's preferred resolution in accordance with the image content in the same way as with conventional adjustments such as contrast and sharpness.

Accordingly, Japanese Unexamined Patent Application Publication No. 2001-238185 has disclosed an information signal processing apparatus that generates a hi-vision video signal corresponding to the values of inputted parameters when converting an NTSC-standard video signal to a hi-vision video signal and enables the user to freely adjust the resolution and the like of images obtained by the hi-vision video signal.

Japanese Unexamined Patent Application Publication No. 2005-94154 has also disclosed an information signal processing apparatus operable when a user adjusts an inputted information signal, such as a video signal, to allow an output of the information signal to have a predetermined quality, to store the final adjustment value of a series of adjustments and also history information relating to a sequence of changes to the adjustment value up to the final adjustment value and/or environment information for the surroundings of the user in a storage medium so that more effective use can be made of the final adjustment value.

According to Japanese Unexamined Patent Application Publication No. 2005-94154, when utilizing the weighting of the final adjustment value, by utilizing the history information (i.e., an operation sequence) relating to a sequence of changes in the adjustment value up to the final adjustment value and the environment information, it becomes possible to make more effective use of the final adjustment value, so that adjustment can be favorably carried out in accordance with the user's preferences, for example.

SUMMARY OF THE INVENTION

However, according to the technology disclosed in Japanese Unexamined Patent Application Publication No. 2005-94154, when the weighting of a final adjustment value is determined from an operation sequence made by the user, the weighting of the adjustment value is uniformly determined in accordance with an operation pattern that has been classified based on the operation sequence or the user's environment.

An operation sequence carried out by the user is influenced by various factors such as the user's personality, the user's current mood, and the surrounding environment. Among the factors that affect such human preferences, human factors (internal factors) for each individual have the greatest influence, and therefore there can be large differences in purpose and operation sequence when operations are carried out by a user. Since such differences between individuals (human factors or internal factors) have not been taken into account by the related art, evaluations of the reliability of such final adjustment values have low accuracy.

According to embodiments of the present invention, there is provided an information signal processing apparatus in which the reliability of evaluations of final adjustment values produced by user operations can be improved.

According to an embodiment of the present invention, first a user uses an adjustment unit to adjust an information signal inputted into an information signal processing apparatus so that an output of the information signal has a predetermined quality. Operation information, which includes a final adjustment value of a series of adjustments carried out by the user and history information relating to a sequence of changes to an adjustment value up to the final adjustment value, is stored in a storage medium in association with preference information of the user during the series of adjustments. The operation information and the preference information, which have been stored in the storage unit for a user whose preference during adjustment could be collected, are then used to estimate preference information corresponding to operation information of a user whose preference during adjustment may not be collected.

For example, operation information for users whose preferences during adjustment can be investigated is stored in the storage medium having been classified into groups in accordance with the characteristics thereof. Next, operation information of users whose preference during adjustment may not be investigated is specified as belonging to one of the groups stored in the storage medium. Preference information of those whose preference during adjustment may not be collected is determined as the same as preference information corresponding to operation information of a user whose preference can be collected and who belongs to the specified group to estimate the preference of the user whose preference during adjustment may not be investigated.

According to the invention described above, an inputted information signal is adjusted by the user so that an output of the information signal has a predetermined quality. As examples, the information signal may be an image signal or an audio signal. When the information signal is an image signal, the output quality is image quality, and adjustment of image quality refers to adjustment of resolution, noise reduction level, luminance, hue, chroma saturation, or the like. Conversely, when the information signal is an audio signal, the output quality is audio quality, and adjustment of audio quality refers to increase/decreases in treble or bass, noise reduction level, volume, or the like.

Accordingly, operation information including history information relating to a sequence of changes up to the final adjustment value of a series of adjustments by the user is used to specify a user group to which a user whose preference has not been investigated belongs, and based on the preference information during adjustment of a user whose preference can be investigated and belongs to the specified group, it is possible to estimate the preference during adjustment of a user whose preference has not been investigated.

According to an embodiment of the present invention, by estimating the preference during adjustment of a user whose preference has not been investigated based on the preference information of users whose preferences have not been investigated, it is possible to evaluate final adjustment values with increased reliability.

BRIEF DESCRIPTION OF THE DRAWINGS

FIG. 13 is a diagram showing a table of operation sequence patterns and preference information of groups to which users belong;

DESCRIPTION OF THE PREFERRED EMBODIMENTS

Preferred embodiments of the present invention will now be described with reference to the attached drawings.

1. System Overview

Figure 1:
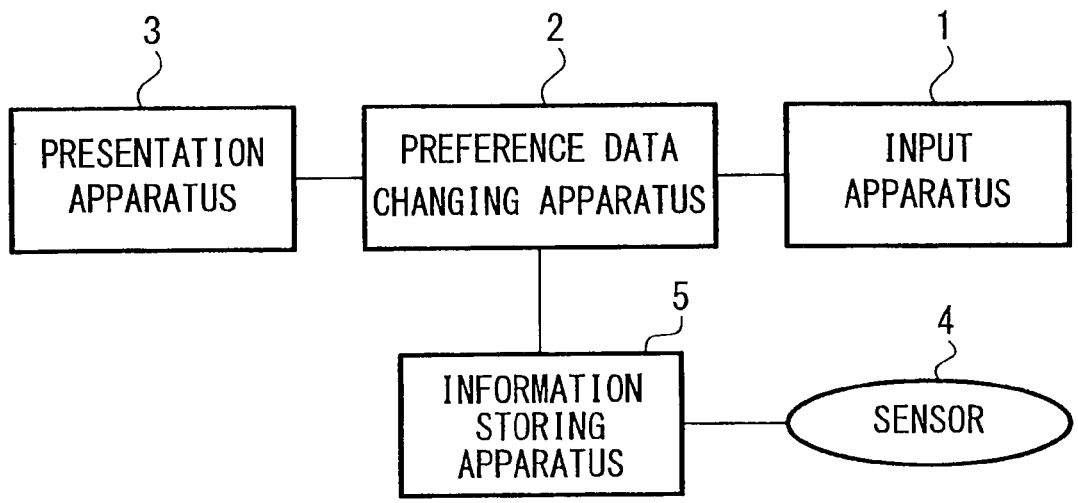
FIG. 1 is a schematic diagram showing a system according to an embodiment of the present invention.

First, an overview of a system according to an embodiment of the present invention will be described. FIG. 1 schematically shows a system including an apparatus operated by a user. This system includes an input apparatus 1, a preference data changing apparatus 2, a presentation apparatus 3, a sensor 4, and an information storing apparatus 5. The preference data changing apparatus 2 and the information storing apparatus 5 are one example of an information signal processing apparatus. Note that the information signal processing apparatus may include the information storing apparatus 5 and the preference data changing apparatus 2 only, or alternatively of a combination of the information storing apparatus 5, the preference data changing apparatus 2, and the sensor 4.

The input apparatus 1 is a signal generator that generates a signal that includes preferences of individuals. In other words, this signal involves a preference-based judgment made by an individual can be clarified. Specific examples of such a signal includes an image signal with a certain resolution level, color balance level, noise level, or the like, and an audio signal with a certain volume, sub-bass level, or the like.

The preference data changing apparatus 2 includes a changing unit that is operated by the user to adjust a quality of the signal inputted from the input apparatus 1 described above, and is an apparatus ("adjustment unit") that can change a signal inputted from the input apparatus 1 to the user's preferred level. As examples of the changing unit of the preference data changing apparatus 2, it is possible to use a rotary-type control, or alternatively, a joystick, a keyboard (or buttons), a mouse, or the like.

The presentation apparatus 3 can present or reproduce a signal, which has changed in accordance with the user operation of the preference data changing apparatus 2, to the user.

A display apparatus, such as a liquid crystal display, plasma display, or the like, and/or a speaker or the like may be used as the presentation apparatus 3.

The sensor 4 is an apparatus (an information obtaining unit) for obtaining information on the external environment when the user is carrying out an operation. As more specific examples, the sensor 4 can be an apparatus that measures the brightness at such location, an apparatus that measures the noise level at such location, an apparatus that measures the distance between the user that carries out the operation and the presentation apparatus 3, or the like.

The information storing apparatus 5 (storage unit) stores information obtained by the preference data changing apparatus 2 and the sensor 4. In some cases, the information storing apparatus 5 is connected to the system including the preference data changing apparatus 2 as shown in FIG. 1, and in other cases, one information storing apparatus 5 is provided for a number of large areas, such as in units of networks like WAN (Wide Area Networks) or LAN (Local Area Networks). When the information storing apparatus 5 is present in network units, the obtained information can be transmitted via the network to the periphery.

In a system configured in this way, the signal inputted from the input apparatus 1, for example, an image signal is changed by the preference data changing apparatus 2 and then images are displayed by the presentation apparatus 3. The user evaluates the images displayed by the presentation apparatus 3 and optionally carries out an operation of the changing unit of the preference data changing apparatus 2. The operation information at this time and environment information obtained by the sensor 4 when the operation is carried out are stored in the information storing apparatus 5.

However, even when the same operation is carried out, the preferences of different users will differ. That is, even if the sequence of changes (hereinafter referred to as the "operation sequence") in a series of adjustments up to a final adjustment value are the same, one user will have carried out the operation with a different intention to other users. The operation sequence and final adjustment value included in this operation information are described in detail later. On the other hand, for users with the same preferences, it is possible to assume that the final adjustment values and the operation sequences carried out in a series of adjustments will be the same. Accordingly, if the preference behind the operation sequence of a certain user is known, it will be possible to use such preference to evaluate the reliability of the final adjustment value more accurately. For this reason, the user is asked about his/her preference during an operation in advance to collect preference information, and operation sequences and preferences of the user are associated in advance, for example. A method that records information on the operation sequence during a series of adjustments by a certain user in the information storing apparatus 5, processes the information on the operation sequence, and estimates user preferences based on the processed information is also conceivable.

Figure 2:
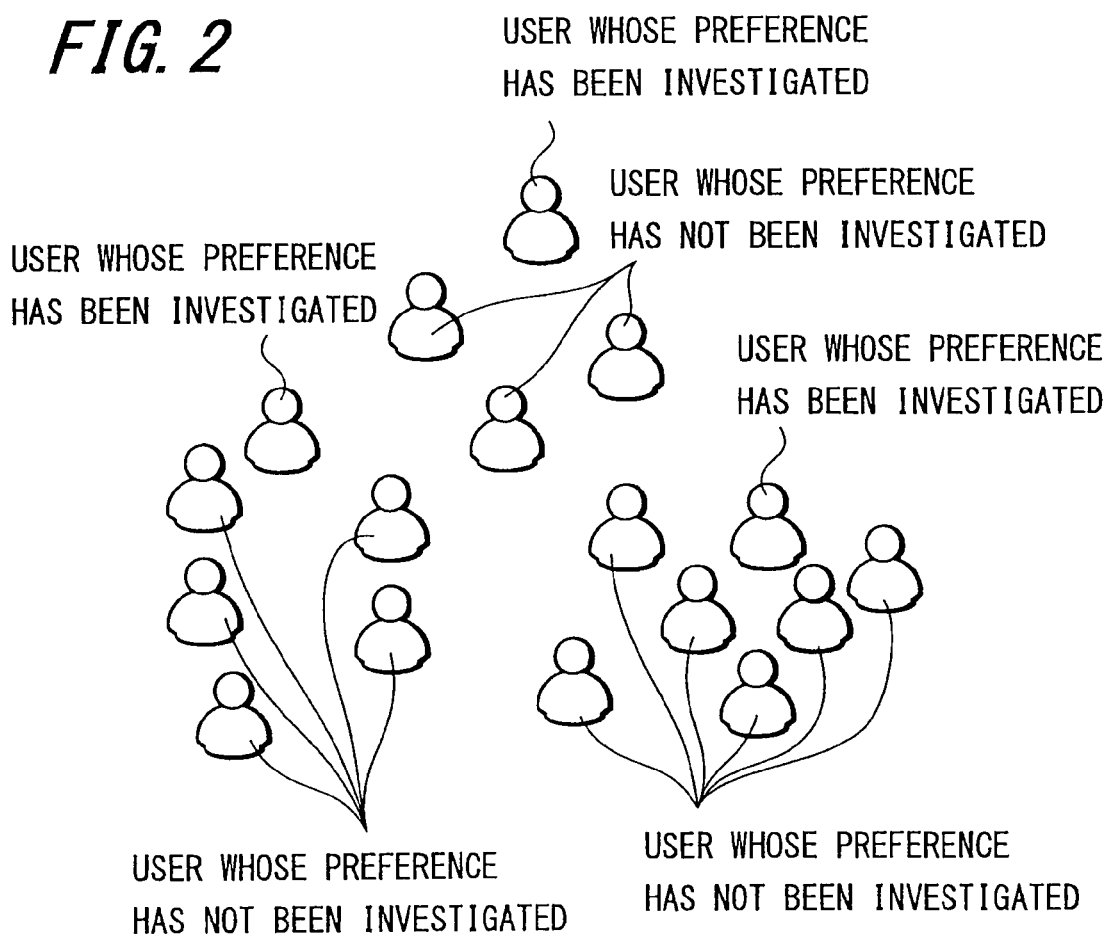
FIG. 2 is a diagram showing examples of users whose preferences have been investigated and users whose preferences have not been investigated.

However, as shown in FIG. 2, it is not possible to ask the preference of every user during a sequence of changes in a series of adjustments up to a final adjustment value, and there are many users whose preference has not been investigated. Accordingly, it is difficult to ask the preferences of, or in other words, to collect preference information from a large number of users during operations. However, it is possible to carry out tests for (i.e., to survey) a limited number of people and to inquire about the user preferences when various operations were made. For users whose preferences have not been investigated, the operation information and environment information described below are obtained. Conversely, from users whose preferences can be investigated, it is possible to obtain preference information in addition to the operation information and environment information described below.

Figure 3:
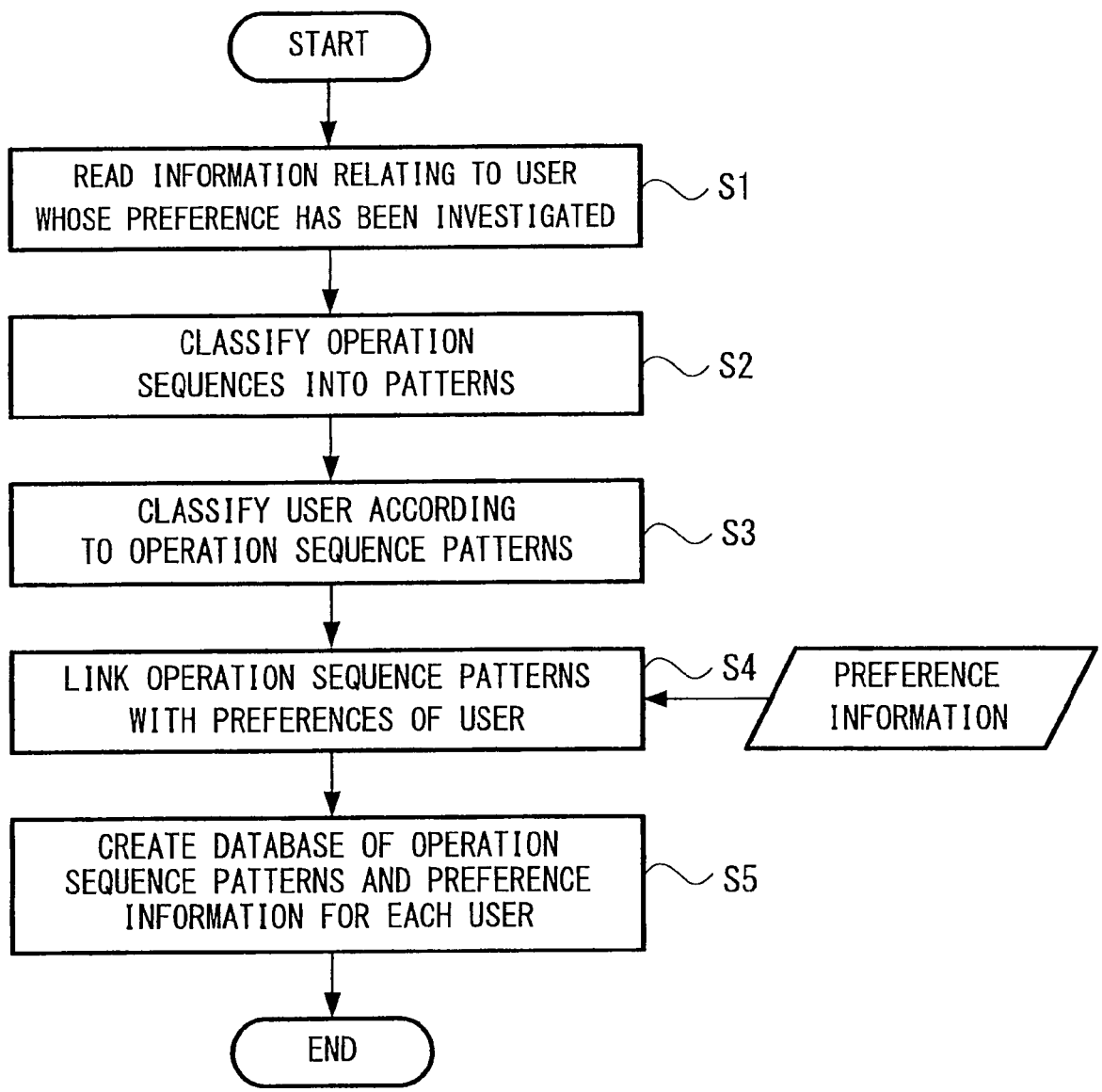
FIG. 3 is a flowchart showing processing of information relating to users whose preferences have been investigated.

Here, the processing of operation information collected from a user whose preference can be investigated will be described with reference to FIG. 3. The processing of the obtained information will be described in detail. In this processing, the preference data changing apparatus 2 and the like are used to collect operation information including operation sequences of a series of adjustments by a plurality of users whose preferences can be investigated, such information is stored in the information storing apparatus 5, and the operation information is then processed using a computer. Note that it is presupposed that the user be asked for preference information during operation before such processing is carried out.

First, operation sequences and preference information for when users adjust a predetermined adjustment item are collected by some kind of means from a plurality of users whose preferences have been able to be investigated and are stored in the information storing apparatus 5. The computer then reads information relating to users whose preferences have been investigated from the information storing apparatus 5 (step S1).

Next, the operation sequences are classified into patterns (step S2). During this classifying of the operation sequences into patterns, the operation sequences are selected from the operation information stored in the information storing apparatus 5 and the operation sequences are classified into a number of patterns (operation sequence patterns) using a number of characteristics, such as the waveform, operation frequency, and operation time.

Note that it is preferable for the classifying into patterns of the operation sequences to be carried out for each final adjustment value. If the classified operation sequence patterns are further classified in advance for each final adjustment value, it will become possible to carry out grouping even more accurately when users are grouped as described later.

Subsequently, the user is classified using the operation sequence patterns described above (step S3). Once all of the operation sequences by a user have been classified in step S1, it will be clarified whether there are any characteristics in the type, frequency, order and the like of the operation sequence patterns present for each user. When classifying users according to the operation sequence patterns, since it is expected that users will have similar preferences if the characteristics described above are similar, such users are classified into the same group.

Next, the operation sequence patterns and preferences of the user are linked (step S4). The operation sequences present in each group classified according to the characteristics of the operation sequence patterns and preference information collected at the testing stage (by surveying users) are linked, and such linking is carried out for all of the operation sequences in all of the groups to create a database (step S5).

Next, the processing of operation information collected from users whose preferences have not been investigated will be described with reference to FIG. 4. Again, the processing of the obtained information will be described in detail. In this processing, the information storing apparatus 5 and the like are used to collect operation information including operation sequences of a series of adjustments by a plurality of users, such information is stored in the information storing apparatus 5, and then a computer is used to process the operation information.

First, a computer reads information relating to users whose preferences have not been investigated from the information storing apparatus 5 (step S11).

Next, the operation sequences are classified into patterns (step S12). During this classifying of the operation sequences into patterns, in the same way as the classifying into patterns of the operation sequences for users whose preferences have been investigated shown in FIG. 3, operation sequences are selected from the operation information stored in the information storing apparatus 5 and the operation sequences are classified into a number of patterns (operation sequence patterns) using a number of characteristics, such as the waveform, operation frequency, and operation time.

Subsequently, the users are classified using the operation sequence patterns described above (step S13). In this classifying of users according to the operation sequence patterns, in the same way as when classifying using the operation sequence patterns of a user whose preference has been investigated as shown in FIG. 3, once all of the operation sequences of the user have been classified in step S11, it can be clarified whether there are any characteristics in the type, frequency, order and the like of the operation sequence patterns present for each user. When classifying users according to the operation sequence patterns, since it is expected that users will have similar preferences if the characteristics described above are similar, the users are classified into groups using such characteristics. Here, it is expected that classifying of users is carried out according to the same classifying conditions for users whose preferences have been investigated and for users whose preferences have not been investigated.

Next, the preference during the operation of a user whose preference has not been investigated is estimated (step S14). During this estimation of the user's preference, preference information on users whose preferences have been investigated and who belong to the same group as the user whose preference has not been investigated is selected from the database with the operation sequence patterns and preference information for each user that is created by the processing in step S5 in FIG. 3. The preference information of the user whose preference has not been investigated is determined as the same as the preference information of users whose preferences can be investigated belonging to the same group as the user whose preference has not been investigated to estimate the preference information of the user whose preference has not been investigated (step S15).

2. Obtained Information

Figure 5:
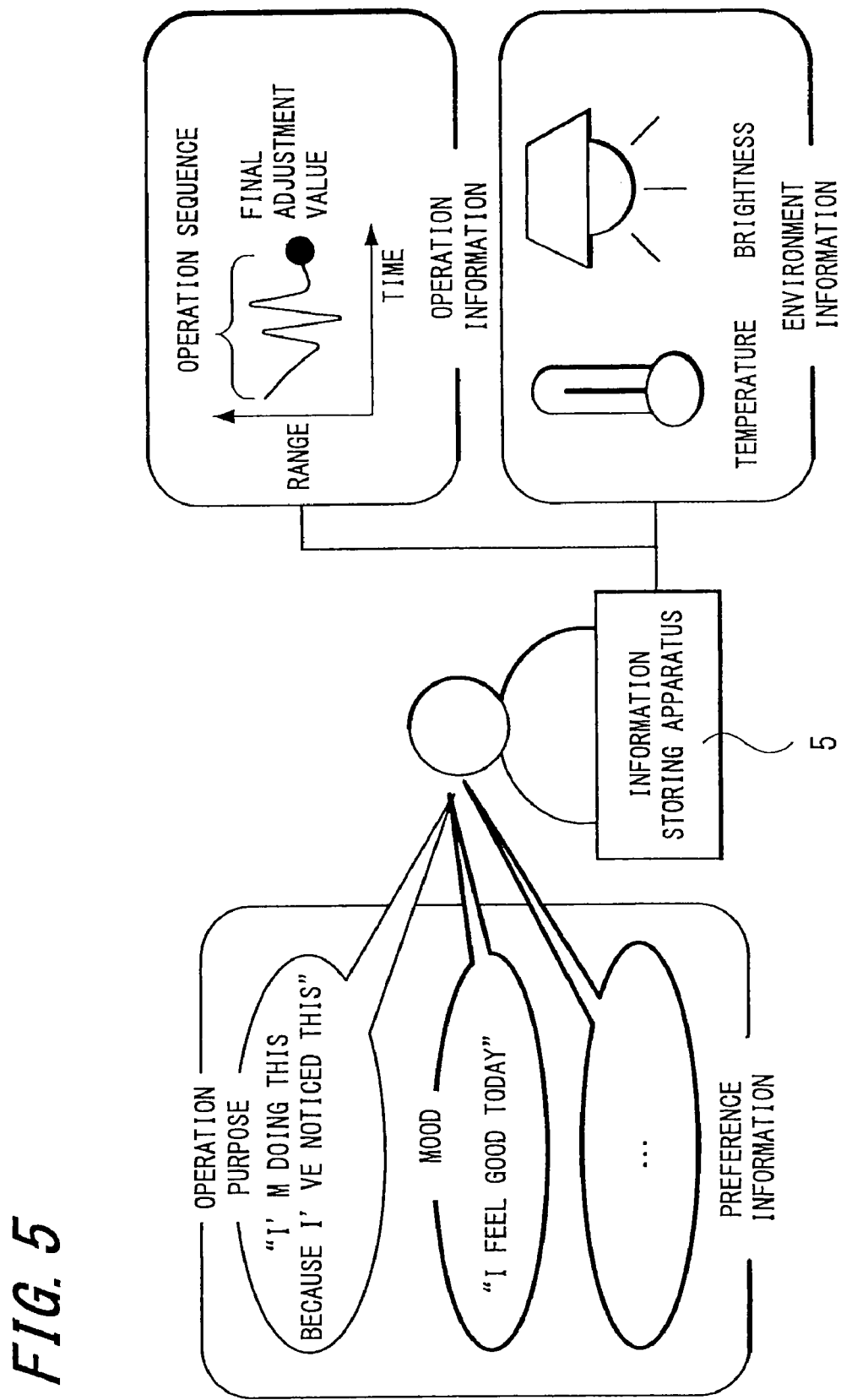
FIG. 5 is a schematic diagram showing obtained information.

Next, the information obtained from users by the information storing apparatus 5 shown in FIG. 1 will be described. FIG. 5 schematically shows the obtained information. As shown in FIG. 5, the information that can be obtained and stored by the information storing apparatus 5 includes operation information, environment information, and preference information. However, the obtained information that can be obtained (collected) in advance is limited to information on users whose preferences can be investigated.

2.(1) Operation Information

Figure 10:
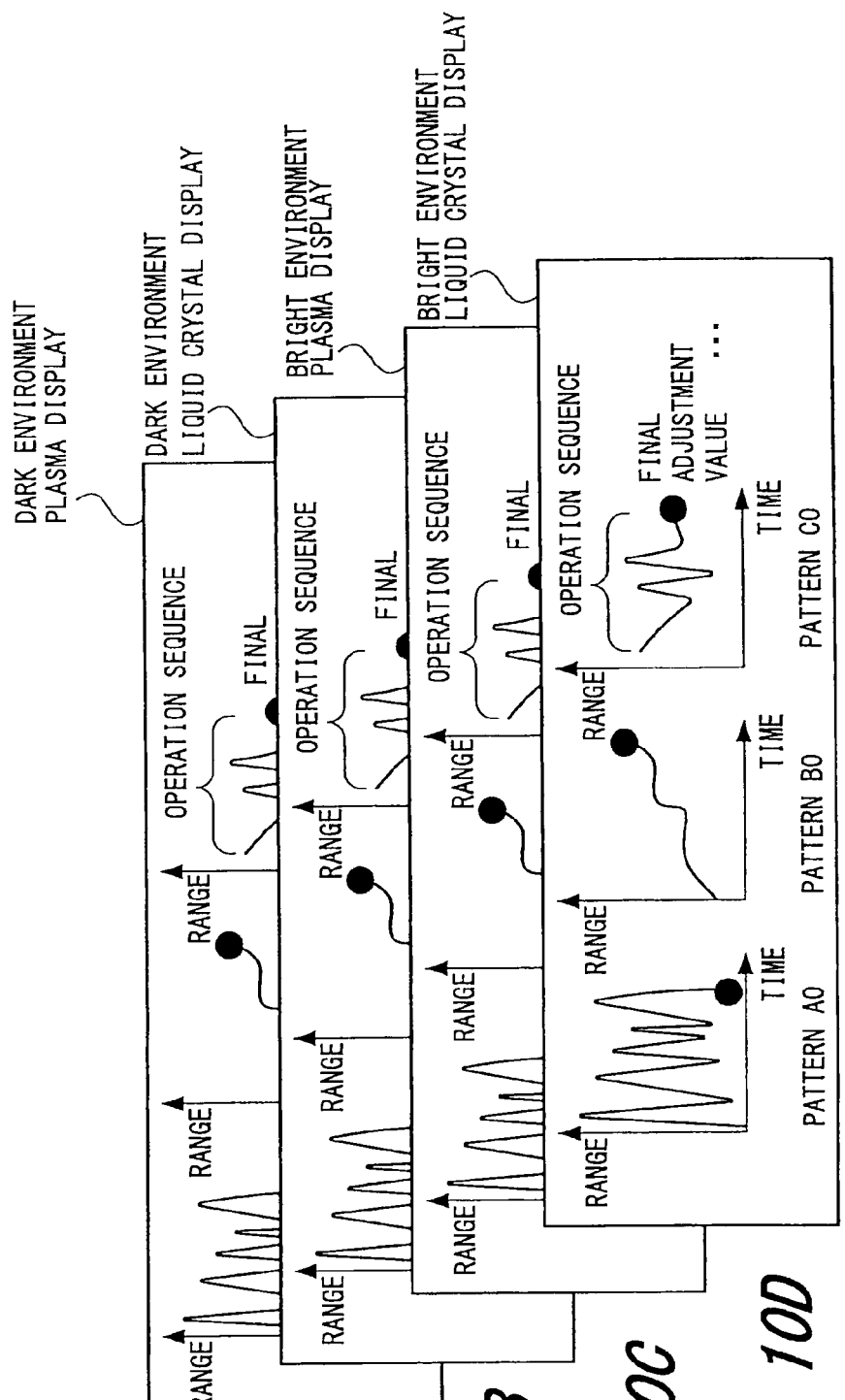
FIGS. 10A to 10D are diagrams showing images of a database in which operation sequence patterns are collated for different pieces of environment information.

The term "operation information" refers to one type of information stored in the information storing apparatus 5 and reflects the user's preference when the user carries out an operation. This operation information can be roughly classified into two types of information that are an "operation sequence" and a "final adjustment value". Since operation information is disclosed in Paragraphs 0104, 0114, 0115 of the specification and FIG. 10 and the like of Japanese Unexamined Patent Application Publication No. 2005-94154 that has already been filed by the present applicant, such information is described in brief here.

2.(1).1 Operation Sequence

The term "operation sequence" refers to the change history of a variable value ("adjustment value") in the preference data changing apparatus 2 and indicates the sequence until a finally settled value (or "final adjustment value") is reached. An operation sequence includes a lot of information. Specific examples of such information are given below.

a. Waveform
b. Number of Oscillations
c. Magnitude of Oscillation
d. Manner of Convergence
e. Convergence Time
f. Speed of Change
g. Change Frequency
h. Operation Time
i. Change over Time in Waveform 2.(1).2 Final Adjustment Value The "final adjustment value" designates a variable value ("adjustment value") that the user has changed using the preference data changing apparatus 2 and whose value has been finally determined or whose value has remained unchanged for a certain period of time.

Figure 6:
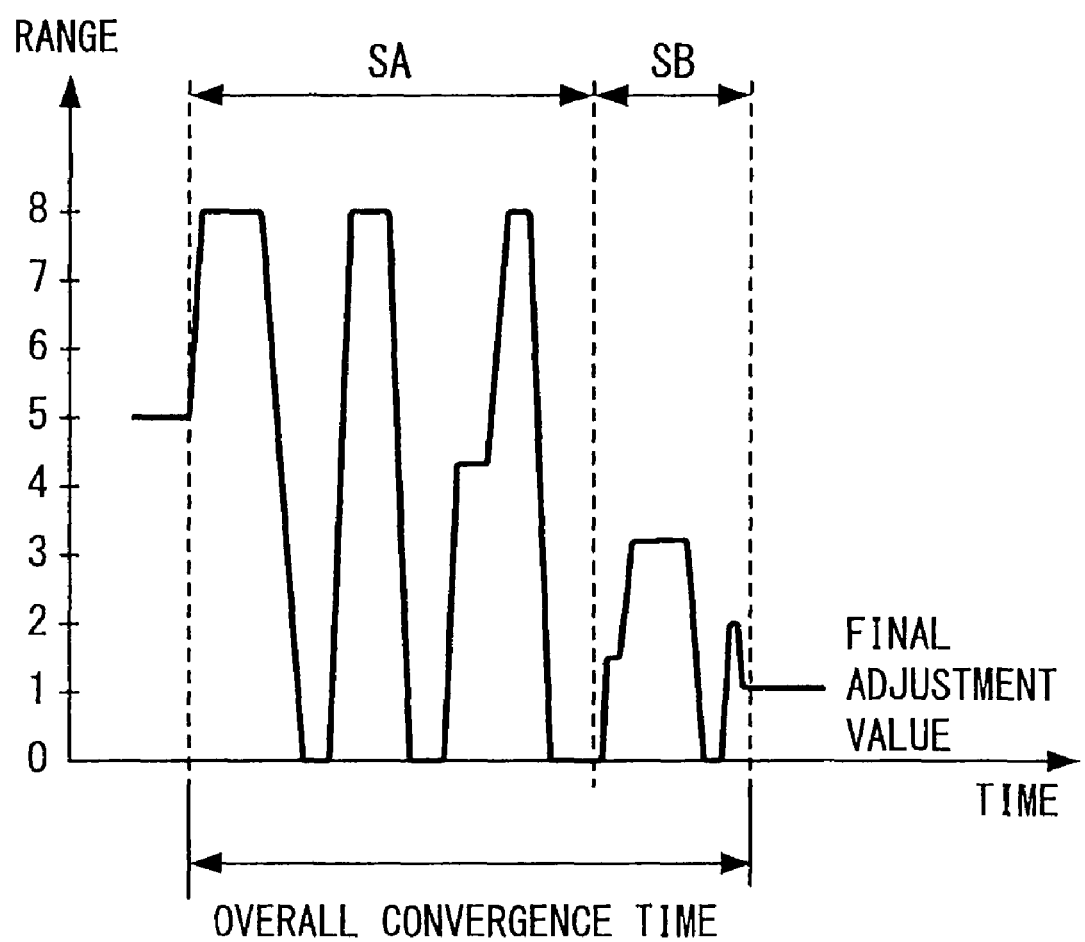
FIG. 6 is a graph showing example changes (an operation sequence) of an adjustment value in a series of adjustments.

FIG. 6 shows examples of changes to an adjustment value in a series of adjustments. In this example, it is expected that the user can adjust the adjustment value in a range of 0 to 8. Note that the time corresponding to the sequence of changes to the adjustment value in the series of adjustments is referred to as the total "convergence time". It can be determined that the series of adjustments has ended and the final adjustment value has been reached according to whether the value has changed to a certain adjustment value and has not changed for a predetermined time.

As the operation sequence (history information), it is possible to store certain adjustment values in the sequence of changes up to the final adjustment value without modification or with a predetermined sampling period in the information storing apparatus 5. Alternatively, processed information obtained thereafter may be stored. For example, as the processed information, it is possible to use information on the overall convergence time shown in FIG. 6 described earlier, shape information on a waveform corresponding to the sequence of changes in the adjustment value, or the like.

For example, shape information on the waveform may be obtained by dividing the sequence of changes in the adjustment value into a first region SA corresponding to a period where the user is looking at changes in the image quality of images displayed on the screen of the presentation apparatus 3 and a second region SB corresponding to a period where the user then carried out adjustment to allow the images to have a predetermined image quality, and sorting the waveform shapes in the respective regions into a plurality of types.

Here, regarding the waveform shape of the first region SA, it is possible to carry out sorting into a plurality of types based on the number of waves included in the region. It is thought that types with a larger number of waves correspond to a case where it is difficult for the user to notice changes in image quality caused by changes in the adjustment value. In such case, the reliability of the final adjustment value is determined from the preference of the user at that time.

Also, regarding the waveform shape of the second region SB, it is possible to sort the manner of attenuation in the amplitude into a plurality of types. In this case, it is thought that when the attenuation is steeper, the user is unable to notice slight changes in the image quality of images and has determined the final adjustment value. Again, the reliability of the final adjustment value is determined from the preference of the user at that time.

Since a method of dividing the sequence of changes in the adjustment value into two regions SA, SB as described above is disclosed in detail in Japanese Unexamined Patent Application Publication No. 2005-94154 that has already been filed by the present applicant, the reader is encouraged to refer to that publication as necessary.

2.(2) Environment Information

The term "environment information" refers to one type of information stored in the information storing apparatus 5 and is information obtained by various sensors to show the operation environment or surrounding environment of the user. Specific examples of such information are given below.

a. Surrounding Brightness
    b. Surrounding Noise
    c. Weather
    d. Display Apparatus
    e. Input Apparatus
    f. Input Format
    g. Other Here, the "other" category may include vibration, installed position and height of appliance, and the like. Information on the installed position and height of the appliance may be inputted by the user or may be obtained using a gravimeter, GPS (Global Positioning System), or the like.

2.(3) Preference Information

The term "preference information" refers to information on internal factors for the user that influence user operations. This information may not be obtained for a large number of users, but can be obtained by testing for a limited number of people. Specific examples of such information are given below.

a. Operation Purpose
    b. Preference
    c. Mood

The term "operational intention" refers to the users thoughts, purpose, and the like regarding the adjustment item. The term "fondness" refers to the user's inclination or taste regarding the adjustment item. The term "mood" refers to the user's psychological state or feeling when the operation is carried out.

3. Processing of Obtained Information

Next, the processing of the obtained information by a computer will be described. This description is divided into classifying operation sequences into patterns, classifying of users according to operation sequence patterns, and estimating the preferences of a user whose preference has not been investigated from users whose preference can be investigated.

3.(1) Classifying Operation Sequences into Patterns

Figure 7:
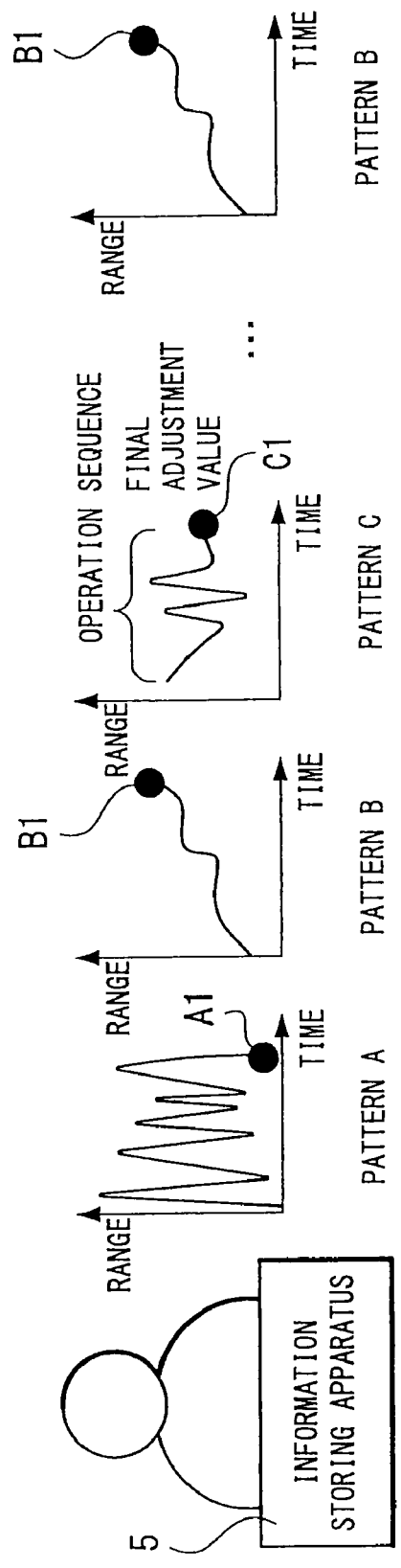
FIG. 7 is a diagram showing example patterns in an operation sequence.

As shown in FIG. 7, there are a number of patterns for operation sequences when a user carries out an operation during adjustment. These patterns for operation sequences are classified into a number of patterns using the characteristics of the operation sequences. As examples, the characteristics (attributes) of an operation sequence may be operation time, manner of convergence, and magnitude of amplitude. The conditions for the respective attributes may be set as follows, for example.

(i) Operation Time (less than a predetermined time/a predetermined time or more)
    (ii) Manner of Convergence (gradual convergence/divergence/no convergence)
    (iii) Magnitude of Amplitude (varied within a variable range/varied only up to a certain intermediate value in a variable range)

In this case, there are twelve (2*3*2) patterns as the patterns of the operation sequences, and each operation sequence by the user can be classified into such twelve patterns. Here, the operation time refers to the time from the start of adjustment by the user until the final adjustment value is reached. Also, if the conditions for the manner of convergence are described for the examples shown in FIG. 7, "gradual convergence", "divergence", and "no convergence" correspond to where the changes near the respective final adjustment values C1, B1, A1 are shown by pattern C, pattern B, and pattern A. Pattern C is a case where the final adjustment value C1 converges to a certain value. Pattern B is a case where the final adjustment value B1 gradually diverges and does not settle at a certain value. Also, pattern A is a case where the final adjustment value A1 does not diverge but the range gradually becomes lower. On the other hand, when the "magnitude of amplitude" condition varied "movement up to variable range", for the example shown in FIG. 6, this corresponds to the first region SA where the adjustment value varies up to the maximum value in the range of 0 to 8. When the "magnitude of amplitude" condition is "varied only up to a certain intermediate value in a variable range", this corresponds to the second region SB where the adjustment value does not vary up to the maximum value in the range of 0 to 8.

3.(2) Classifying of User According to Operation Sequence Patterns

Figure 8:
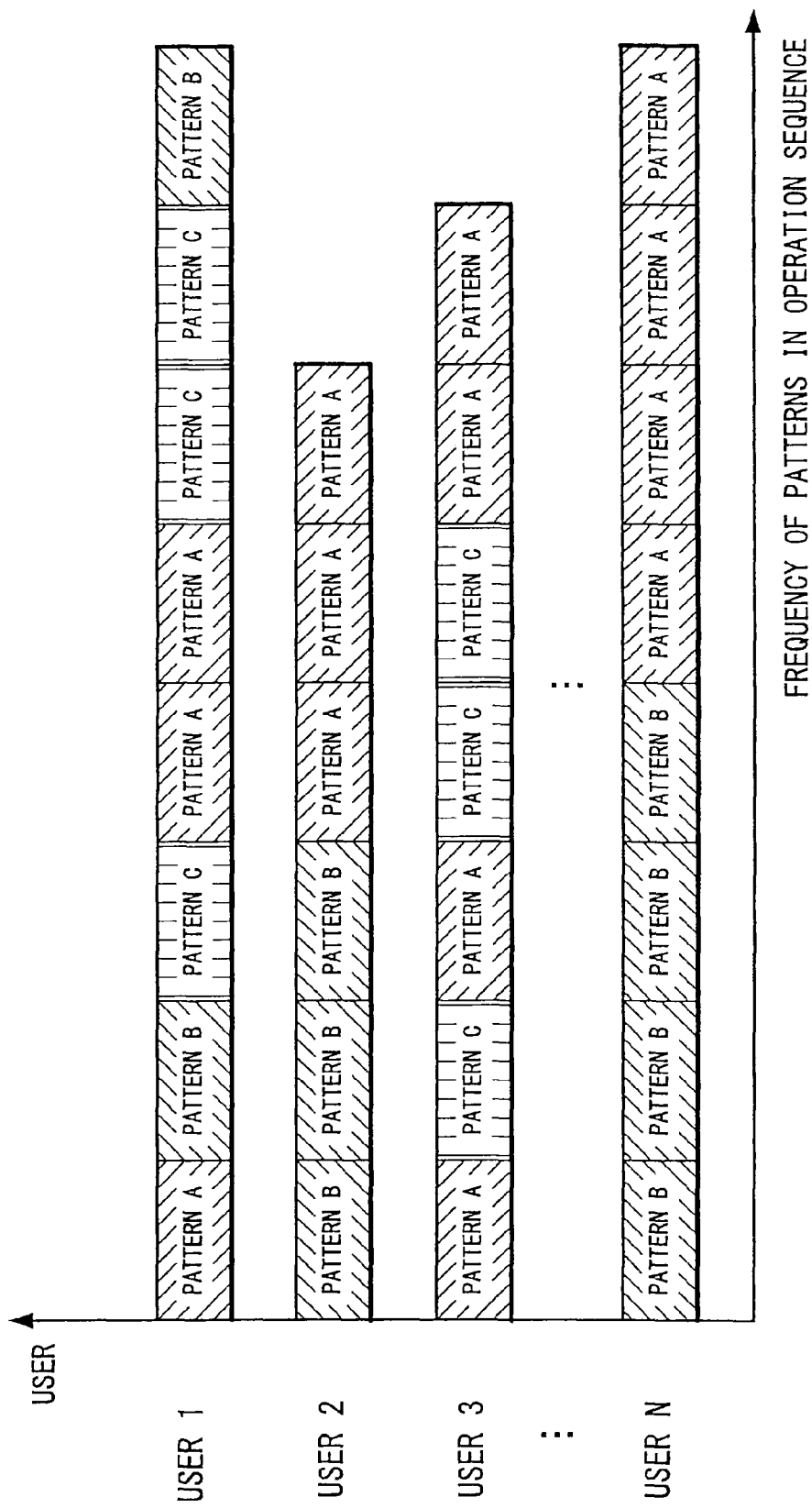
FIG. 8 is a diagram showing example patterns in operation sequences of different users.
Figure 11:
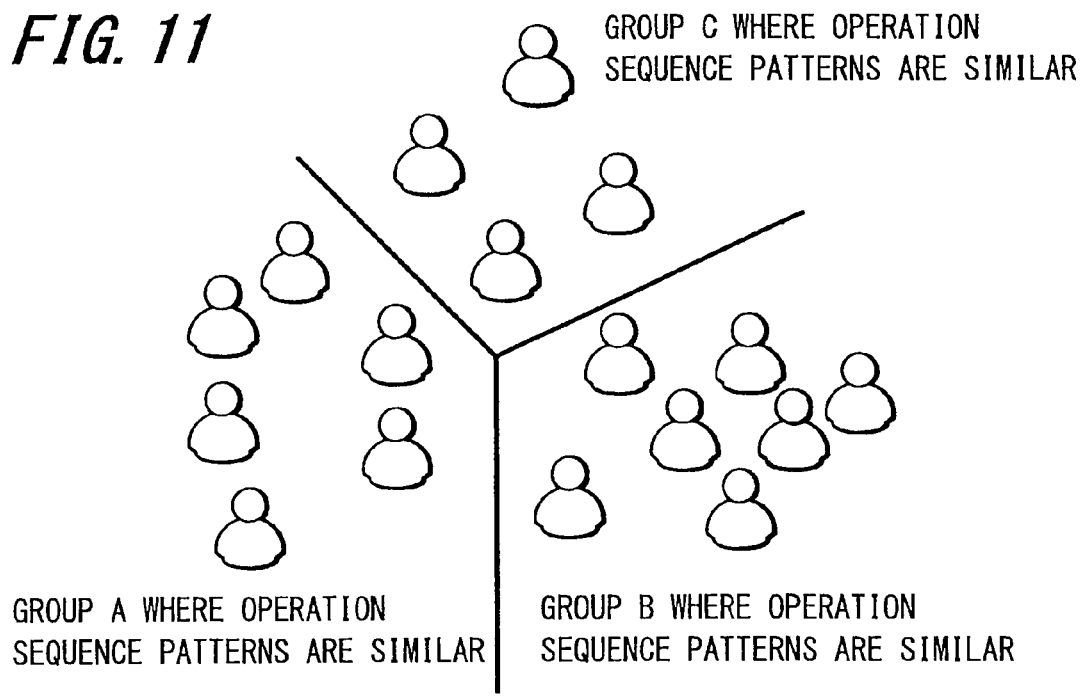
FIG. 11 is a diagram showing an example classification of users according to operation sequence patterns.

If it is possible to classify the respective operation sequences of users into patterns as shown in FIG. 7, it will also be possible to classify the user using such information. As shown in FIG. 8, there are operation sequence patterns for individual users. In FIG. 8, based on the appearance frequency, appearance ratio, and the like of the operation sequence patterns, the users can be classified into groups A to C as shown in FIG. 11. For example, when users are classified based on frequencies of the operation sequence patterns that users perform in the first half and second half of the operation sequence, with the users 1 to N shown in FIG. 8, user 2 and user N have many operation sequence patterns B in the first half (such users having three and four consecutive pattern B, respectively). On the other hand, since both users have many operation sequence patterns A in the second half (three and four consecutive pattern A, respectively), such users are classified into the same group due to the frequency of the operation sequence patterns being similar.

Figure 4:
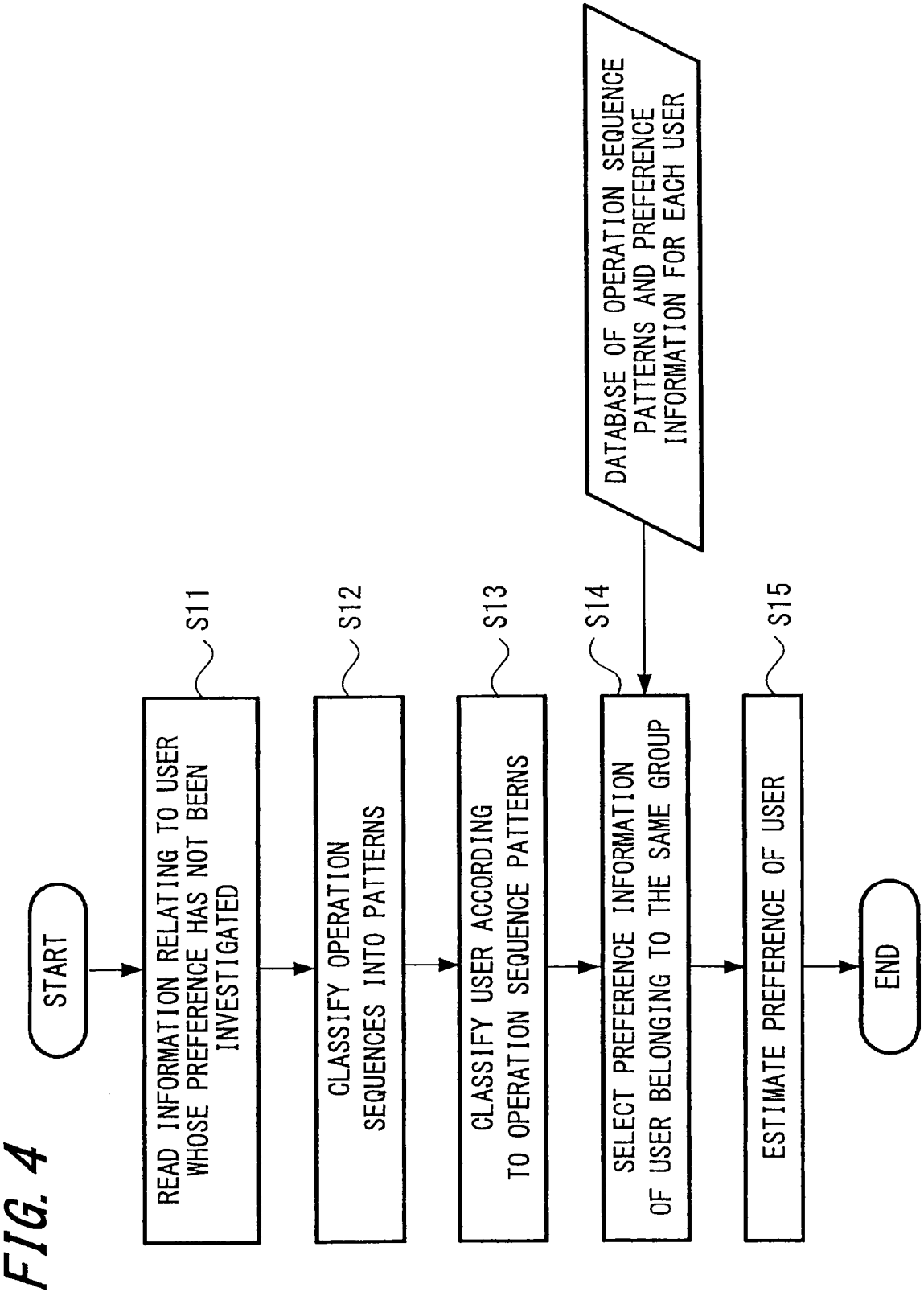
FIG. 4 is a flowchart showing processing of information relating to users whose preferences have not been investigated.
Figure 9:
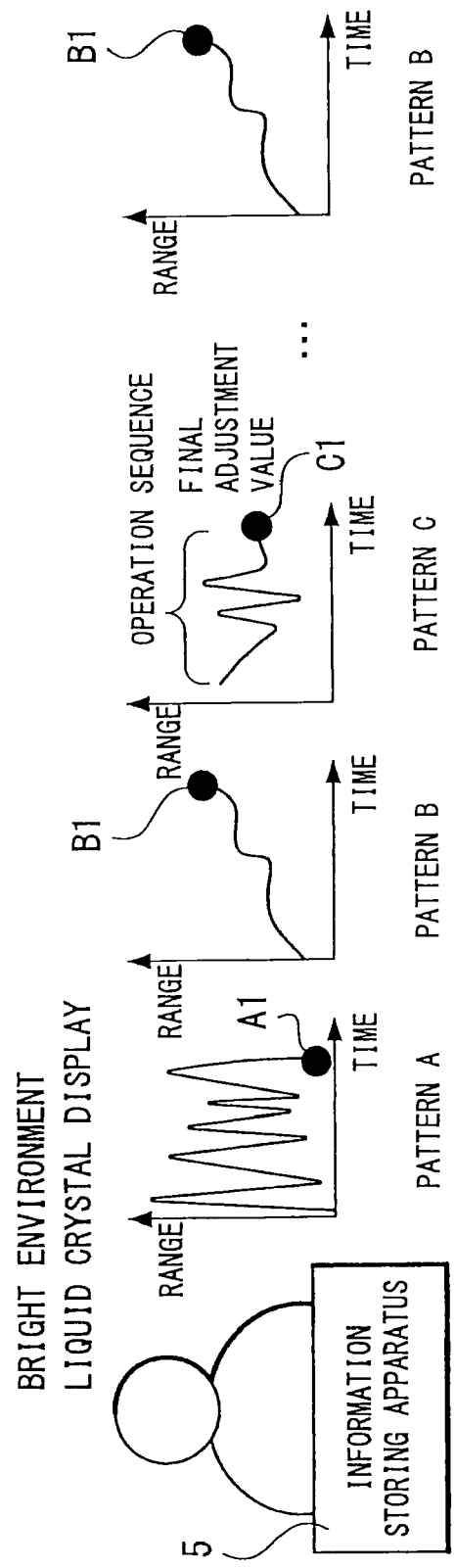
FIG. 9 is a diagram showing example patterns in operation sequences and environment information.

In the present embodiment, the environment information can be obtained using the sensor 4 as shown in FIG. 4. Accordingly, environment information patterns exist in addition to there being a number of operation sequence patterns for each operation by the user during adjustment. Accordingly, using the characteristics of the operation sequences and the environment information, the patterns of the operation sequences and environment information are classified into a number of patterns. For example, when the environment information is "bright environment and liquid crystal display", the operation sequence patterns shown in FIG. 7 are stored in the information storing apparatus 5 paired with the environment information "bright environment and liquid crystal display" as shown in FIG. 9.

In the present embodiment, the conditions of the attributes of the environment information shown in "2.(2) Environment Information" are set as shown below, for example.

(i) Surrounding Brightness (bright/dark)
    (ii) Surrounding Noise (noisy/quiet)
    (iii) Weather (sunny/cloudy/rain)
    (iv) Display Apparatus (CRT/liquid crystal display/plasma display)
    (v) Input Apparatus (Blu-ray/HD-DVD/DVD/VHS)
    (vi) Input Format (480i/480p/720p/1080i/1080p)

When characteristics of the operation sequence and environment information are used, there are a large number of patterns with combinations of such information, and the operation patterns of users can be classified into such patterns.

FIGS. 10A to 10D show example images of a database of operation sequence patterns generated from the operation sequences and the environment information. In the examples shown in FIGS. 10A to 10D, the operation sequence patterns are classified for each piece of environment information, and as examples the operation sequence patterns in FIG. 10A correspond to "a dark environment and a plasma display", the operation sequence patterns in FIG. 10B correspond to "a dark environment and a liquid crystal display", the operation sequence patterns in FIG. 10C correspond to "a bright environment and a plasma display", and the operation sequence patterns in FIG. 10D correspond to "a bright environment and a liquid crystal display".

3.(3) Estimating the Preference of a User Whose Preference has not been Investigated from Users Whose Preferences can be Investigated Users whose preferences can be investigated are provided in each of the three groups shown in FIG. 11, and by asking the users about their preferences during operations, a table (database), such as that shown in FIG. 13, of the operation sequence patterns and preference information is created for each group to which the users belong and stored in the information storing apparatus 5. For the examples shown in FIGS. 10A to 10D, every operation sequence pattern in group A and group B, respectively, is associated with the preference information when such pattern is carried out.

Figure 12:
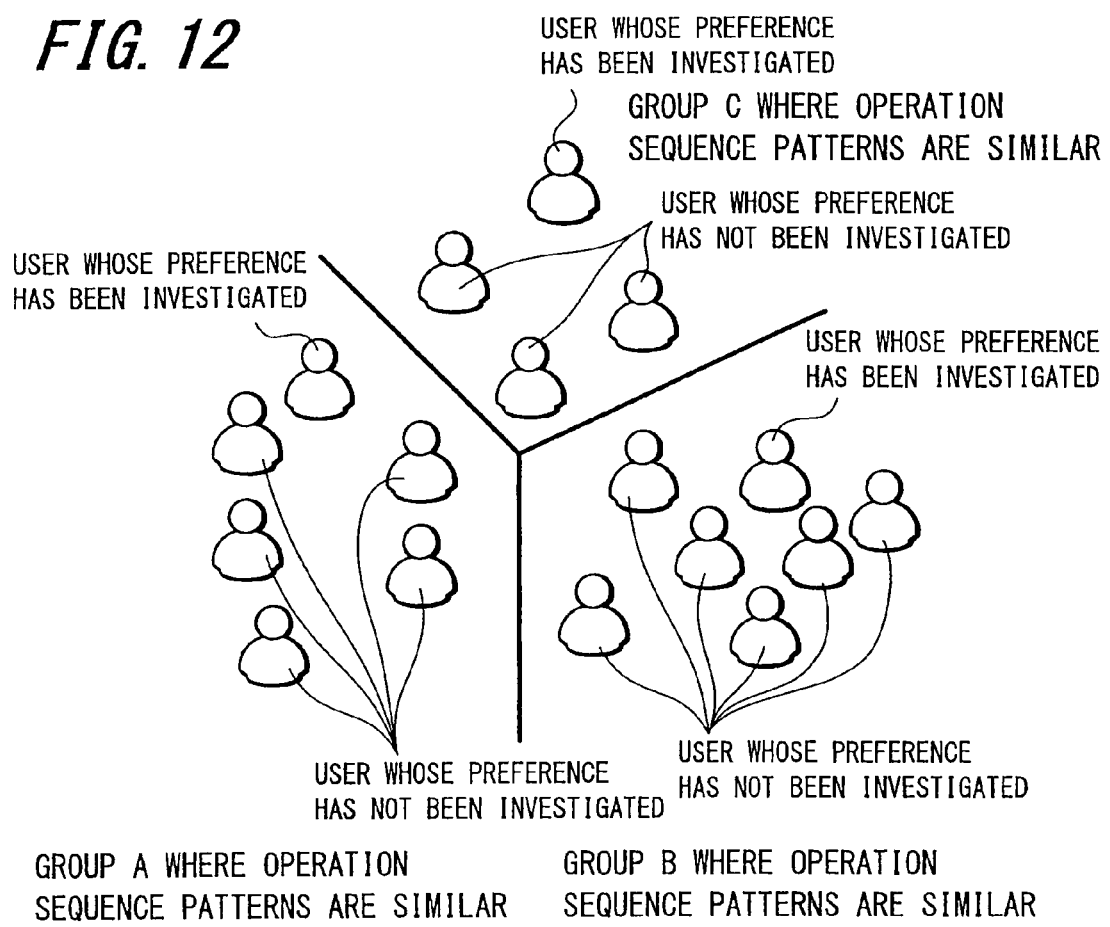
FIG. 12 is a schematic diagram showing how the preferences of users whose preferences have not been investigated are estimated.

If the group to which a user whose preference has not been investigated belongs can be clarified from an operation sequence pattern, it will be possible to determine such user as having the same preference as users whose preferences can be investigated and who belong to the same group as shown in FIG. 12 and thereby estimate the preference during operation of the user whose preference has not been investigated.

Figure 14:
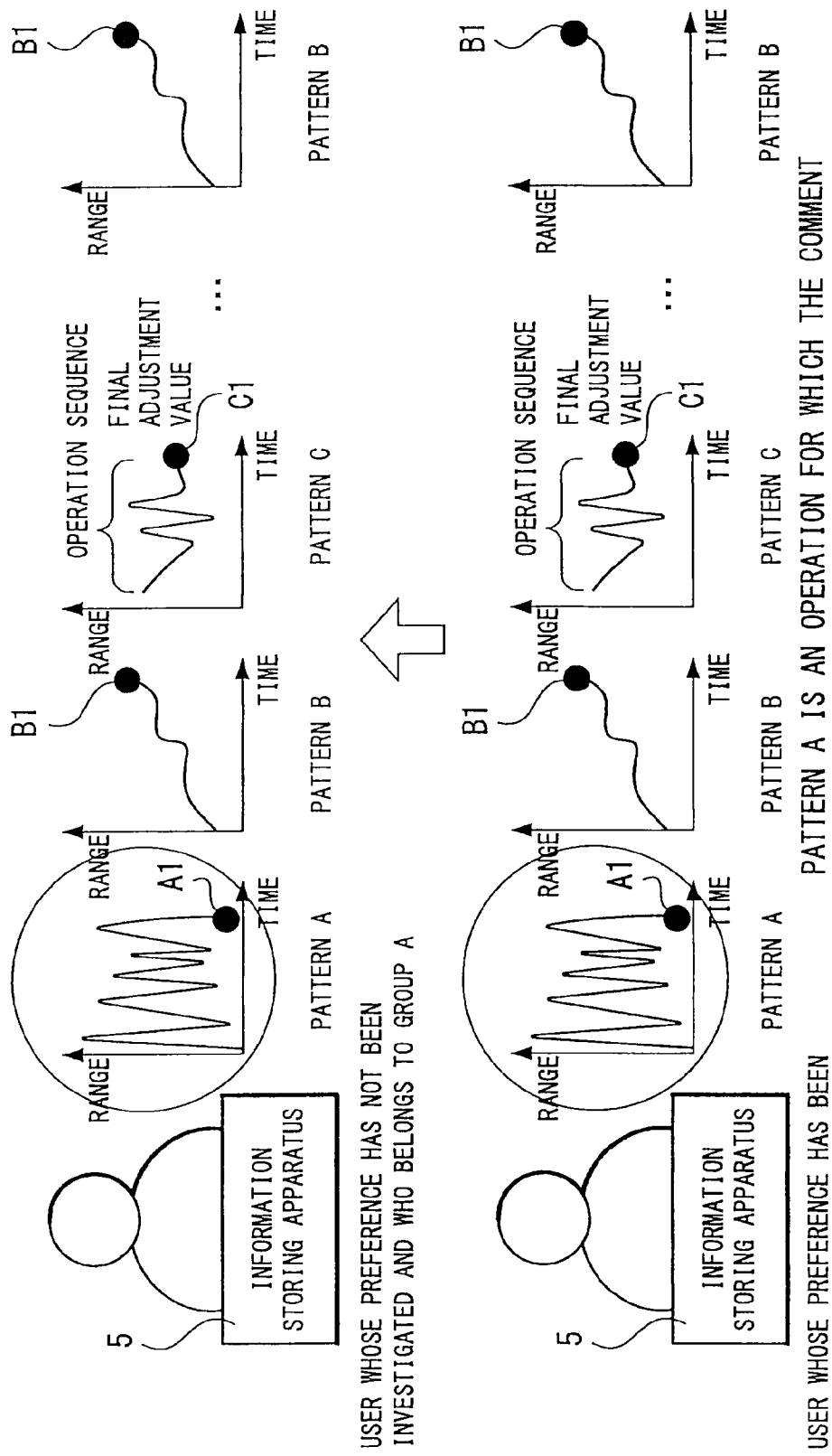
FIG. 14 is a diagram useful in explaining the estimating of user preferences.

As one example, assume that as shown in FIG. 14, when the operation sequences of a user whose preference has not been investigated are classified into patterns, it is discovered that the user belongs to group A. For group A, a database such as that shown in FIG. 13 has been completed from the operation information and preference information collected from users whose preferences can be investigated. The preferences of the respective operation sequence patterns of users who belong to group A and whose preferences can be investigated can be clarified from this database.

In this example, since the operation sequence pattern A is an operation for which the comment "I have noticed a difference in noise" has been received, when the operation sequence of a user whose preference has not been investigated is pattern A, it is possible to specify that this is the operation sequence for when "I noticed a difference in noise". Accordingly, the final adjustment value determined by carrying out the operation sequence pattern A can be evaluated as an adjustment value that sufficiently reflects the user's preference regarding noise. Accordingly, when evaluating the final adjustment value, since such final adjustment value can be reliable as an adjustment value that sufficiently reflects the user's preference regarding noise, the final adjustment value can be evaluated with increased reliability.

In this way, it is possible to specify the user group to which a user whose preference has not been investigated belongs using the sequence of changes up to the final adjustment value in the series of adjustments carried out by the user, and based on the preference information of users whose preferences can be investigated and who belong to the specified group, it is possible to estimate the preference during operation of the user whose preference has not been investigated. As a result, by estimating the preference during operation of the user whose preference has not been investigated, it is possible to evaluate the final adjustment value in a series of adjustments by a user whose preference has not been investigated with increased reliability.

4. Specific Example Applied to a Television Receiver

An example where an embodiment of the present invention is applied to a television receiver will now be described. In the following description, the television receiver main unit, the obtaining apparatus, the sensor, and the storing apparatus are described separately.

4.(1) Television Receiver Main Unit

Figure 15:
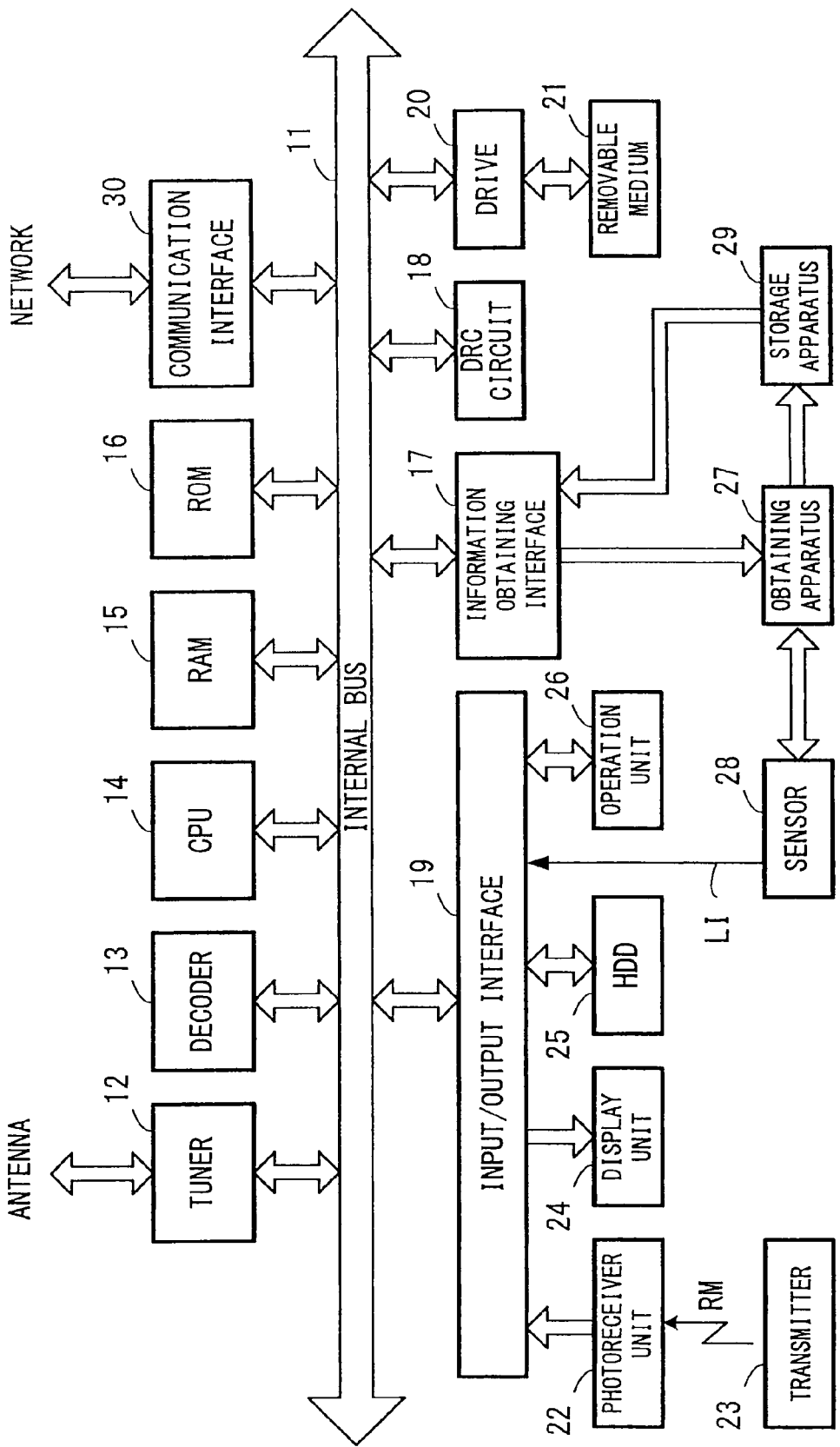
FIG. 15 is a block diagram showing the configuration of a television receiver according to an embodiment of the present invention.

FIG. 15 is a block diagram showing one example of the configuration of a television receiver as a specific embodiment of the present invention. As disclosed in Japanese Unexamined Patent Application Publication No. 2005-94154 that has already been filed by the present applicant, the television receiver 10 has a function for converting a broadcast signal that has been received by a tuner 12, for example, an SD (Standard Definition) signal that is a 525i signal, to an HD (High Definition) signal that is a 1050i signal, for example, and displaying images according to such HD signal. Here, a 525$i$ signal is an interlaced image signal with 525 lines and a 1050i signal is an interlaced image signal with 1050 lines.

The pixel data of a 1050i signal includes line data L1, L1' at positions near lines in the 525i signal and line data L2, L2' at positions far from lines in the 525i signal. Here, L1 and L2 are line data of odd-numbered fields and L1' and L2' are line data of even-numbered fields. Also, the number of pixels on each line in the 1050i signal is twice the number of pixels on each line in the 525i signal.

In the television receiver 10, the tuner 12, a decoder 13, a CPU (Central Processing Unit) 14, a RAM (Random Access Memory) 15, a ROM (Read Only Memory) 16, an information obtaining interface 17, a DRC (Digital Reality Creation) circuit 18, and an input/output interface 19 are interconnected via an internal bus 11. In addition, a drive 20 and a communication interface 30 are optionally connected. A photoreceiver unit 22, a display unit 24, an HDD (Hard Disk Drive) 25, an operation unit 26, and a sensor (information obtaining unit: the same function as the sensor 4 shown in FIG. 1) 28 are connected to the input/output interface 19. An obtaining apparatus 27 and a storage apparatus 29 are connected to the information obtaining interface 17.

A transmitter (hereinafter referred to as the "remote control transmitter") 23 that outputs a remote control signal is one example of a transmitter unit and outputs a light signal (in this example, an infrared signal) in accordance with a user operation, with the light signal being inputted into the photoreceiver unit 22. The user can also input instructions by operating the operation unit 26 that is one example of an adjustment unit. The CPU 14 carries out processing based on received instructions. By operating the remote control transmitter 23, for example, the user can input an adjustment value for adjusting the image quality of images displayed on the display unit 24. Note that spatial resolution and temporal resolution, noise reduction level, luminance, hue, chroma saturation, and the like can be given as examples of adjustment items for image quality. In the following example, adjustment of spatial resolution and temporal resolution is described.

The CPU 14 that functions as an adjustment unit or a preference estimating unit carries out various processes in accordance with a program stored in the ROM 16 or a program loaded into the RAM 15 from the HDD 25. The RAM 15 arbitrarily stores data and the like that is required by the CPU 14 to execute various processing. In addition to storing an OS (operating system) and application programs executed by the CPU 14, the HDD 25 also stores data based on the broadcast signal received from the tuner 12.

When an infrared signal RM has been inputted from the remote control transmitter 23 into the photoreceiver unit 22 based on a user operation, or when the user has inputted an instruction into the operation unit 26, the CPU 14 causes the tuner 12 to receive a broadcast signal from a broadcast channel, not shown, and causes the decoder 13 to decode the signal. The decoder 13 outputs an SD signal (a 525i signal) based on the decoded broadcast signal via the internal bus 11 to the DRC circuit 18.

The DRC circuit 18 receives the SD signal (525i signal) and converts the SD signal to an HD signal (a 1050i signal). The DRC circuit 18 adjusts the spatial resolution and temporal resolution of the images displayed by the HD signal based on adjustment values s, z (see FIG. 16, described later) of the spatial resolution and temporal resolution described earlier that have been indicated by the user and also based on the environment information for the surroundings of the user obtained by the sensor 28. In the present embodiment, as one example, light information LI is supplied to the DRC circuit 18 as the environment information. Note that one example of the configuration of the DRC circuit 18 is disclosed in Japanese Unexamined Patent Application Publication No. 2005-94154 (see FIG. 5).

The HD signal obtained by the DRC circuit 18 is outputted via the internal bus 11 and the input/output interface 19 to the display unit 24. The display unit 24 displays images according to this HD signal. As examples, the display unit 24 includes a CRT (Cathode-Ray Tube) display, or a liquid crystal display (LCD), plasma display panel (PDP), or the like.

The adjustment values s, z of the spatial resolution and temporal resolution described above are outputted by the information obtaining interface 17. The obtaining apparatus 27 is connected to this information obtaining interface 17. Based on the adjustment values s, z of the spatial resolution and temporal resolution outputted by the information obtaining interface 17, the obtaining apparatus 27 obtains final adjustment values of a series of adjustments to the adjustment values s, v made by the user and adjustment values in the sequence of changes up to the final adjustment values. The final adjustment values and the like obtained by the obtaining apparatus 27 are sent to the storage apparatus 29. Here, the obtained information may be stored in the HDD 25 instead of in the storage apparatus 29.

The environment information for the surroundings of the user obtained by the sensor 28 for each series of adjustments to the adjustment values s, z of the spatial resolution and temporal resolution described above is sent via the obtaining apparatus 27 to the storage apparatus 29 and is stored in relation to the final adjustment values and the history information (information on the operation sequence). The environment information obtained here may be a single type or a plurality of types. Examples of the environment information may include brightness, noise, viewing distance, viewing direction, temperature, humidity, time, electromagnetic state, and the like. Note that example configurations of the obtaining apparatus 27, the sensor 28, and the storage apparatus 29 will be described later with reference to FIG. 16.

The internal bus 11 is optionally connected to the drive 20, a removable medium 21 composed of a magnetic disk, an optical disk, a magneto-optical disk, or a semiconductor memory is optionally attached to the drive 20, and a computer program read from such medium is optionally installed into the HDD 25.

The communication interface 30 is connected to the bus 11 and via this communication interface 30, data communication can be carried out between the television receiver 10 and a telecommunication network such as the Internet. For example, according to an instruction directed by the CPU 14, an image signal and audio signal may be downloaded via the communication interface 30 from the network and stored in the HDD 25. Also according to an instruction directed by the CPU 14, operation information, which includes final adjustment values and operation sequences stored in the storage apparatus 29, and environment information may be transmitted via the communication interface 30 to another party on the network.

In the television receiver 10 configured as described above, the obtaining apparatus 27 and the storage apparatus 29 are one example of the information storing apparatus 5 shown in FIG. 1. The display unit 24 is one example of the presentation apparatus 3 shown in FIG. 1. The operation unit 26 and the remote control transmitter 23 are one example of a changing unit of the preference data changing apparatus 2 shown in FIG. 1. The removable medium 21 and the HDD 25 include the same storage function as the information storing apparatus 5. In addition, the removable medium 21 and the HDD 25 are examples of the input apparatus 1 that supplies the input signal, and content data such as images recorded in the removable medium 21 or the HDD 25 are read out based on an instruction directed by the CPU 14 and displayed on the display unit 24.

Next, the operation of the television receiver 10 shown in FIG. 15 will be described.

The broadcast signal received by the tuner 12 is supplied to the decoder 13 via the internal bus 11. In the decoder 13, decoding processing, error correction processing, and the like are carried out on the broadcast signal from the tuner 12 to obtain an SD signal (525i signal) based on this broadcast signal. The SD signal obtained by the decoder 13 is supplied via the internal bus 11 to the DRC circuit 18.

In the DRC circuit 18, processing that converts the SD signal from the decoder 13 to an HD signal (1050i signal) is carried out. In this case, based on the adjustment value s of the spatial resolution, the adjustment value z of the temporal resolution, and light information LI on the brightness of the user's surroundings obtained by the sensor 28, the spatial resolution and the temporal resolution of the images displayed according to the HD signal are adjusted.

The HD signal obtained by the DRC circuit 18 is supplied via the internal bus 11 and the input/output interface 19 to the display unit 24. Images produced by the HD signal are then displayed on the screen of the display unit 24.

The adjustment values s of the spatial resolution and the adjustment value z of the temporal resolution described above are continuously outputted by the information obtaining interface 17. These adjustment values s, z are changed by adjustment operations that are carried out by the user which will be described later. The obtaining apparatus 27 obtains, from the adjustment values s, z outputted from the information obtaining interface 17, the final adjustment values of the series of adjustments to the adjustment values s, z and the sequence of changes up to such final adjustment values. The final adjustment values and the like are sent to the storage apparatus 29 and the final adjustment values and history information (operation sequence) relating to the sequence of changes in the adjustment values until the final adjustment values are determined are stored either without modification or after being processed.

Environment information for the user's surroundings is also obtained for each series of adjustments to the adjustment values s, z described above. Subsequently, the obtained environment information is sent via the obtaining apparatus 27 to the storage apparatus 29 and the environment information is stored in association with the final adjustment values and the history information in a database. When the user operating the television receiver 10 is a user whose preference can be investigated, the final adjustment values, history information, and environment information stored in the storage apparatus 29 are used to create a database that includes preference information together with the operation sequence patterns for different users, and are then used to estimate the preference of a user whose preference has not been investigated. When the user operating the television receiver 10 is a user whose preference has not been investigated, the user's preference is estimated based on a database including operation sequence patterns and preference information of users whose preferences can be investigated.

In this case, it is possible to determine the reliability of the final adjustment values using the history information and possible to determine in what kind of environment the final adjustment values were produced based on the environment information, which means that the final adjustment values can be effectively used.

The user can adjust the spatial and temporal resolution of images displayed on the screen on the display unit 24 as described earlier by operating the remote control transmitter 23. In the DRC circuit 18, pixel data that includes the HD signal (hereinafter referred to for convenience as "HD pixel data") is calculated according to an estimation equation as disclosed in Japanese Unexamined Patent Application Publication No. 2005-94154. Here, values that correspond to the adjustment values s, z that determine the temporal and spatial resolution adjusted by a user operation of the remote control transmitter 23 are generated by a generation equation that includes the adjustment values s, z as parameters and such values are used as the coefficient data in this estimation equation. Accordingly, the spatial and temporal resolution of images displayed according to the HD signal obtained by the DRC circuit 18 correspond to the adjustment values s, z.

Figure 16:
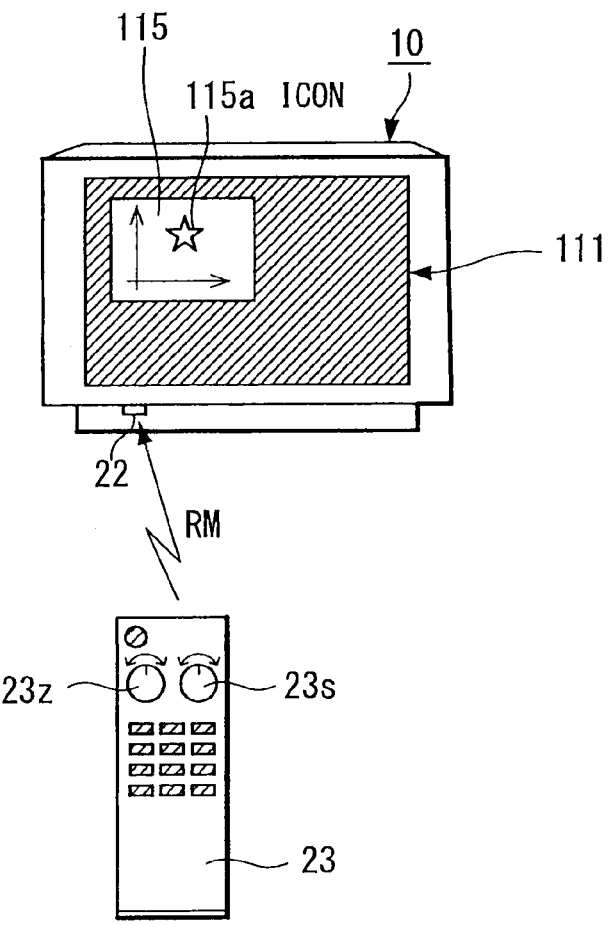
FIG. 16 is a view of an example user interface for adjusting image quality.
Figure 17:
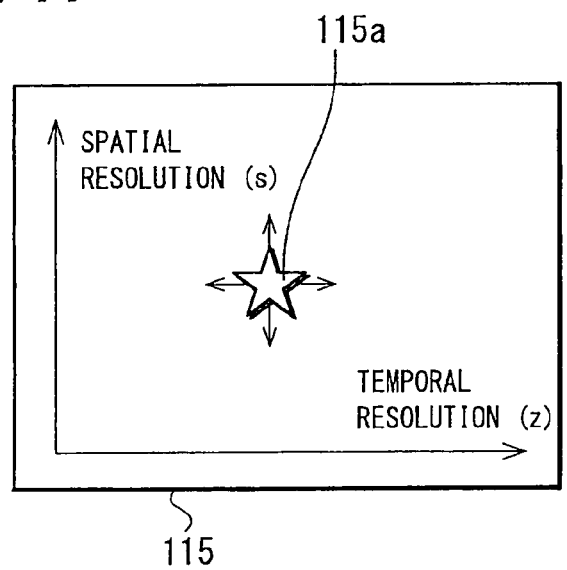
FIG. 17 is an enlarged view of an adjustment screen.

FIG. 16 shows one example of a user interface for adjusting the adjustment values s, z of the spatial resolution and the temporal resolution. During adjustment, an adjustment screen 115 in which an adjustment position of the adjustment values s, z is shown by a star icon 115a is displayed as an OSD (On Screen Display) on the display unit 24 (see FIG. 15). The remote control transmitter 23 includes rotary controls 23z, 23s as user operation means. FIG. 17 is an enlarged view of the adjustment screen 115.

By operating the control 23z, the user can move the position of the icon 115a on the adjustment screen 115 to the left or right and thereby adjust the adjustment value z of the temporal resolution. Similarly, by operating the control 23s, the user can move the position of the icon 115a on the adjustment screen 115 up or down and thereby adjust the adjustment value s of the spatial resolution. The user can refer to the adjustment screen 115 displayed on the display unit 24 and adjust the adjustment values s, z, which means such adjustments are easy to carry out.

Note that in place of the rotary controls 23z, 23s, the remote control transmitter 23 may be provided with see-saw type buttons, push buttons, or a pointing device such as a joystick, a mouse, or a trackball. Also, the adjustment values s, z adjusted by the user may be displayed on the adjustment screen 115 as numbers. Note that it is also possible to carry out adjustment by directly operating the operation unit 26 of the television receiver 10 without using the remote control transmitter 23.

4.(2) Obtaining Apparatus, Sensor, and Storing Apparatus

Figure 18:
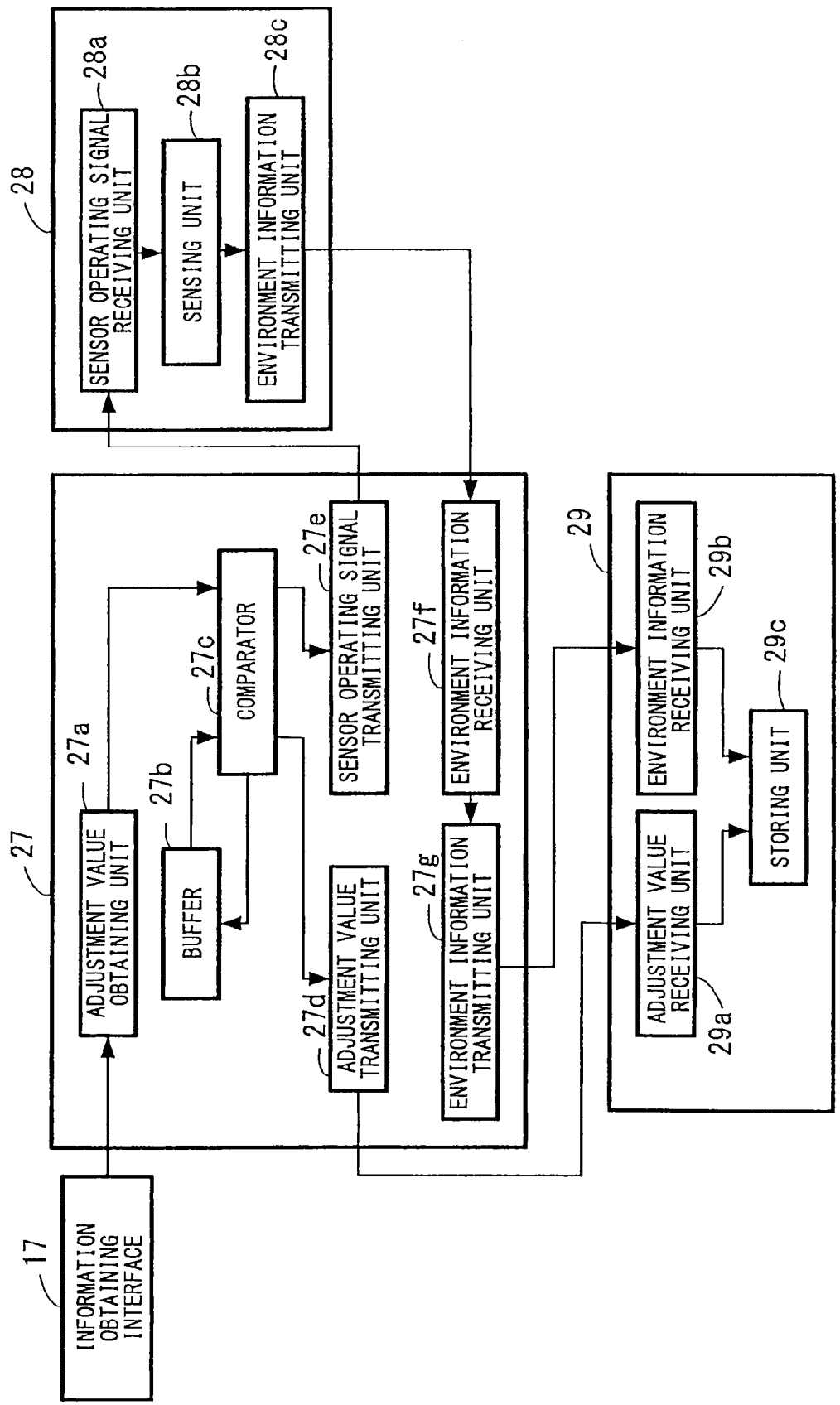
FIG. 18 is a block diagram showing the configurations of an obtaining apparatus, a sensor, and a (television-side) storage apparatus.

Next, the obtaining apparatus 27, the sensor 28, and the storage apparatus 29 will be described in detail. FIG. 18 shows the configurations of the obtaining apparatus 27, the sensor 28, and the storage apparatus 29. An example where the spatial resolution and the temporal resolution of images are adjusted is described below.

4.(2).1 Obtaining Apparatus

First, the obtaining apparatus 27 will be described. The obtaining apparatus 27 includes an adjustment value obtaining unit 27a, a buffer 27b, a comparator 27c, an adjustment value transmitting unit 27d, a sensor operating signal transmitting unit 27e, an environment information receiving unit 27f, and an environment information transmitting unit 27g.

The adjustment value obtaining unit 27a periodically obtains the adjustment value s of the spatial resolution and the adjustment value z of the temporal resolution that are continuously outputted from the information obtaining interface 17 (see FIG. 15). The buffer 27b stores adjustment values s, z for comparing with the adjustment values s, z obtained by the adjustment value obtaining unit 27a. The comparator 27c compares the present adjustment value s obtained by the adjustment value obtaining unit 27a and the adjustment value s stored in the buffer 27b and sends the present adjustment value s to the adjustment value transmitting unit 27d if such values are not equal. In the same way, the comparator 27c compares the present adjustment value z obtained by the adjustment value obtaining unit 27a and the adjustment value z stored in the buffer 27b and sends the present adjustment value z to the adjustment value transmitting unit 27d if such values are not equal.

The adjustment value transmitting unit 27d transmits the adjustment values s, z sent from the comparator 27c to the storage apparatus 29. Here, time information is appended to the adjustment values s, z obtained by the adjustment value obtaining unit 27a. Accordingly, the adjustment values s, z sent from the comparator 27c to the adjustment value transmitting unit 27d and transmitted to the storage apparatus 29 are also appended with time information. Accordingly, even if the adjustment values s, z are transmitted only intermittently from the obtaining apparatus 27 to the storage apparatus 29, it will still be possible to reproduce, in the storage apparatus 29, the sequence of changes in the adjustment values during a series of adjustments. Note that when the adjustment values s, z are sent from the comparator 27c to the adjustment value transmitting unit 27d, the adjustment values s, z are also sent to the buffer 27b so that the adjustment values s, z stored by the buffer 27b are updated.

When the adjustment values s, z are sent from the comparator 27c to the adjustment value transmitting unit 27d, the sensor operating signal transmitting unit 27e transmits a sensor operating signal to the sensor 28. The environment information receiving unit 27f receives the environment information transmitted from the sensor 28. The environment information transmitting unit 27g transmits the environment information received by the environment information receiving unit 27f to the storage apparatus 29.

Figure 19:
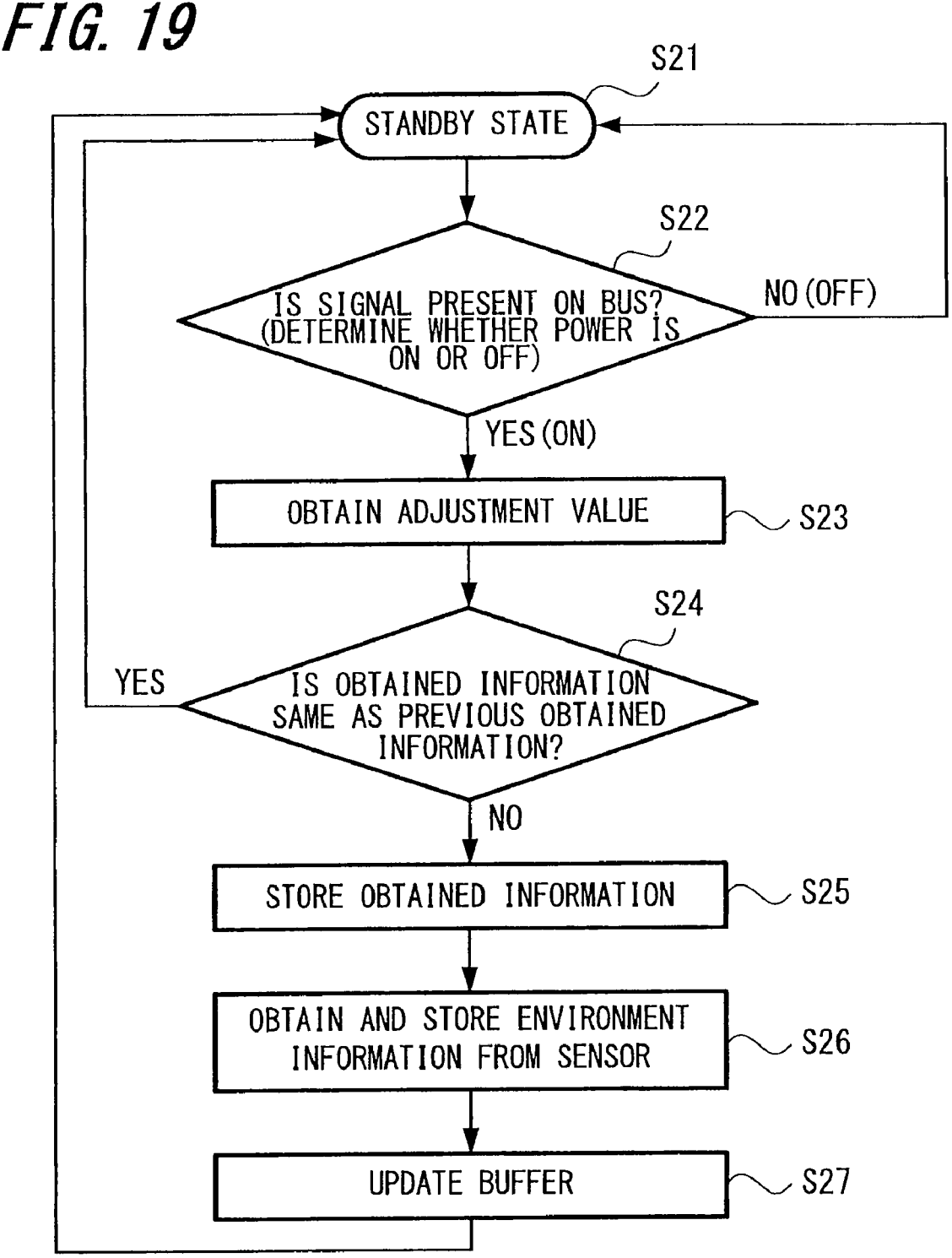
FIG. 19 is a flowchart showing the operation of an (television-side) obtaining apparatus.

The operation of the obtaining apparatus 27 will now be described with reference to FIG. 19.

When the obtaining apparatus 27 is in the standby state in step S21, the processing periodically proceeds to step S22. Subsequently, in step S22, it is determined whether the adjustment values s, z have been outputted to the internal bus 11, that is, whether the power is on. When the power is off, the processing returns to the standby state in step S21. On the other hand, when the power is on, the processing proceeds to step S23. In step S23, the adjustment value obtaining unit 27a obtains adjustment values s, z outputted from the information obtaining interface 17. In this case, the obtained adjustment values s, z are appended with time information.

Next, in step S24, the comparator 27c compares the adjustment values s, z (obtained values) obtained by the adjustment value obtaining unit 27a and the adjustment values s, z (stored values) stored in the buffer 27b and determines whether the values are the same. When the values are the same, the processing returns to the standby state in step S21. On the other hand, when the values are not the same, the processing proceeds to step S25.

In step S25, the comparator 27c transmits the adjustment value s obtained by the adjustment value obtaining unit 27a when it has been determined that the values of the adjustment value s are not the same or the adjustment value z obtained by the adjustment value obtaining unit 27a when it has been determined that the values of the adjustment value z are not the same from the adjustment value transmitting unit 27d to the storage apparatus 29 so that the values are stored as log data during the adjustment. Note that since the adjustment value s and the adjustment value z are adjusted separately (see FIG. 16), in step S24, there will be no cases where the values of the adjustment value s and the adjustment value z are both determined to have changed.

Next, in step S26, the sensor operating signal transmitting unit 27e transmits the sensor operating signal to the sensor 28, the environment information receiving unit 27f receives the environment information transmitted from the sensor, and the environment information transmitting unit 27g transmits the environment information to the storage apparatus 29. The storage apparatus 29 stores the environment information as log data for when the adjustment value is obtained.

Next, in step s27, the stored content of the buffer 27b is updated and subsequently, the processing returns to the standby state in step S21. Here, the adjustment value obtained by the adjustment value obtaining unit 27a when it has been determined that the adjustment value s is not the same, or the adjustment value z obtained by the adjustment value obtaining unit 27a when it has been determined that the adjustment value z is not the same, is sent from the comparator 27c to the buffer 27b and the content of the buffer 27b is updated.

When the user adjusts the adjustment values s, z, the adjustment value s continuously outputted from the information obtaining interface 17 changes. The obtaining apparatus 27 described above can obtain the final adjustment values in the series of adjustments and adjustment values in the sequences of changes up to such final adjustment values for the adjustment values s, z and can transmit such values to the storage apparatus 29.

4.(2).2 Sensor

Next, the sensor 28 will be described. The sensor 28 shown in FIG. 18 includes a sensor operating signal receiving unit 28a, a sensing unit 28b, and an environment information transmitting unit 28c. The sensor operating signal receiving unit 28a receives the sensor operating signal sent from the obtaining apparatus 27.

The sensing unit 28b includes various sensors for obtaining environment information for the surroundings of the user, for example, information on brightness, noise, viewing distance, viewing direction, temperature, humidity, time, electromagnetic state, and the like. The various sensors of the sensing unit 28b switch to a sensing state when the sensor operating signal is received by the sensor operating signal receiving unit 28a described above and thereafter obtain information. However, regarding the sensor (light sensor) that obtains the light information LI, as described earlier the light information LI is used by the DRC circuit 18 (see FIG. 15), and therefore the light sensor periodically switches to the sensing state to obtain the light information LI.

The environment information transmitting unit 28c transmits the environment information obtained by the various sensors of the sensing unit 28b described above to the obtaining apparatus 27.

Figure 20:
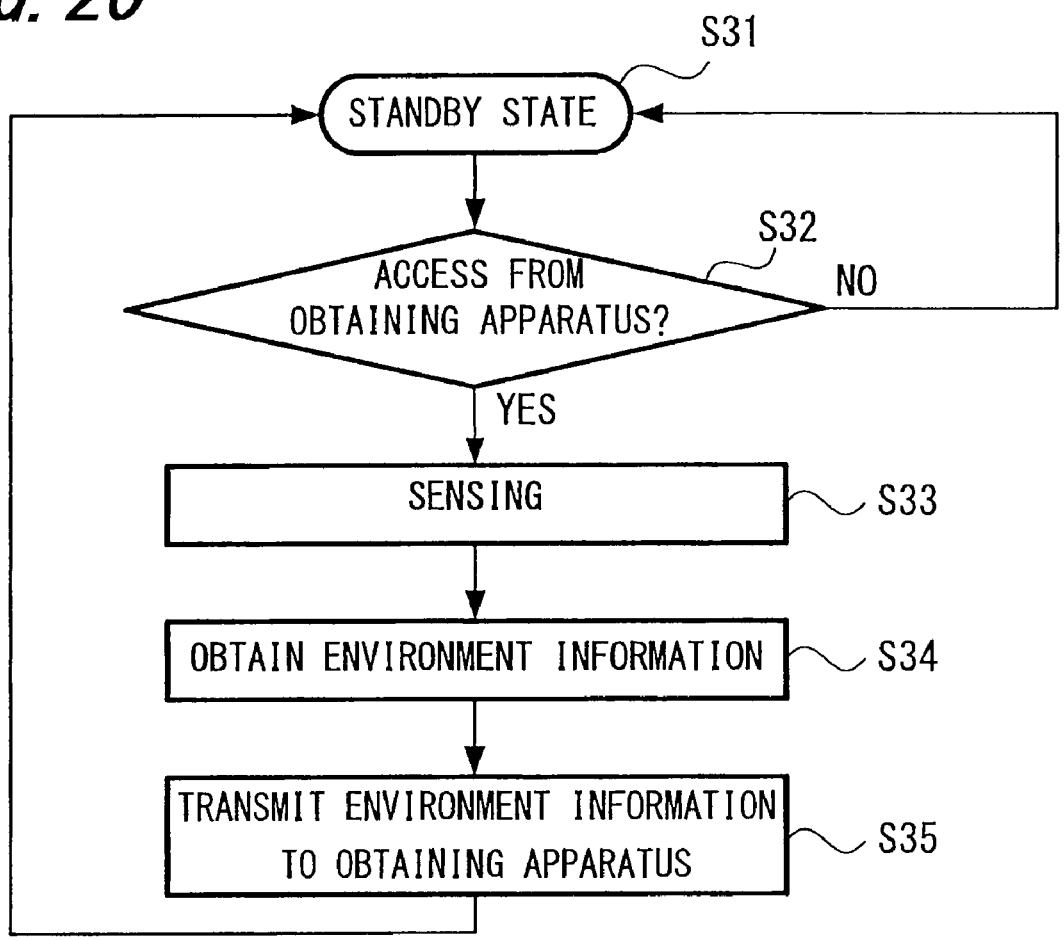
FIG. 20 is a flowchart showing the operation of a (television-side) sensor.

The operation of the sensor 28 will now be described with reference to the flowchart in FIG. 20.

When the sensor 28 is in the standby state in step S31, the processing periodically proceeds to step S32. In step S32, it is determined whether the sensor operating signal has been received by the sensor operating signal receiving unit 28a. When the sensor operating signal has not been received, the processing returns to the standby state in step S31. On the other hand, when the sensor operating signal has been received, the processing proceeds to step S33.

In step S33, the various sensors of the sensing unit 28b are switched to the sensing state, and in step S34, the various sensors obtain the environment information. Subsequently, in step S35, the environment information transmitting unit 28c transmits the environment information obtained by the various sensors of the sensing unit 28b to the obtaining apparatus 27 and the processing then returns to the standby state in step S31.

In this way, when the sensor operating signal is sent from the obtaining apparatus 27, environment information on the user's surroundings is obtained by the various sensors of the sensing unit 28b and the environment information is transmitted to the obtaining apparatus 27. Note that the light information LI is obtained periodically regardless of when the sensor operating signal has been transmitted from the obtaining apparatus 27.

4.(2).3 Storing Apparatus

Next, the storage apparatus 29 will be described. The storage apparatus 29 shown in FIG. 18 includes an adjustment value receiving unit 29a, an environment information receiving unit 29b, and a storing unit 29c. The adjustment value receiving unit 29a receives the adjustment values s, z sent from the obtaining apparatus 27. The environment information receiving unit 29b receives the environment information sent from the obtaining apparatus 27.

The storing unit 29c stores the final adjustment values of a series of adjustments to the adjustment values s, z and history information relating to the sequences of adjustment values up to the final adjustment values, based on the adjustment values s, z received by the adjustment value receiving unit 29a, or in other words, based on the final adjustment values of a series of adjustments to the adjustment values s, z and the sequences of changes up to the final adjustment values.

Here, as the history information, it is possible to store the adjustment values in the sequences of changes up to the final adjustment values without modification or to store processed information obtained from such values. For example, the processed information described with reference to FIG. 6 may be information on the overall convergence time or may be shape information on a waveform corresponding to the sequences of changes in the adjustment values.

4.(3) Example Where Obtaining Apparatus is Connected to a Remote Control Transmitter In the embodiment described above, an example is described where the obtaining apparatus 27 is connected to the information obtaining interface 17 of the television receiver 10 and obtains the final adjustment values of series of adjustments to the adjustment values s, z and adjustment values in the sequences of changes to the final adjustment values from the main unit of the television receiver 10.

However, provided that the condition that the obtaining apparatus 27 is able to access the required information is satisfied, the obtaining apparatus 27 can be set up in any locations. For example, it would also be possible to connect this type of obtaining apparatus 27 to the remote control transmitter 23 and obtain the final adjustment values of series of adjustments to the adjustment values s, z and adjustment values in the sequences of changes to the final adjustment values from the remote control transmitter 23. While it is possible to obtain information at the television receiver 10 when the television receiver 10 itself has been actually operated, when the obtaining apparatus 27 is connected to the remote control transmitter 23, information for when the user carries out an operation can be obtained.

Figure 21:
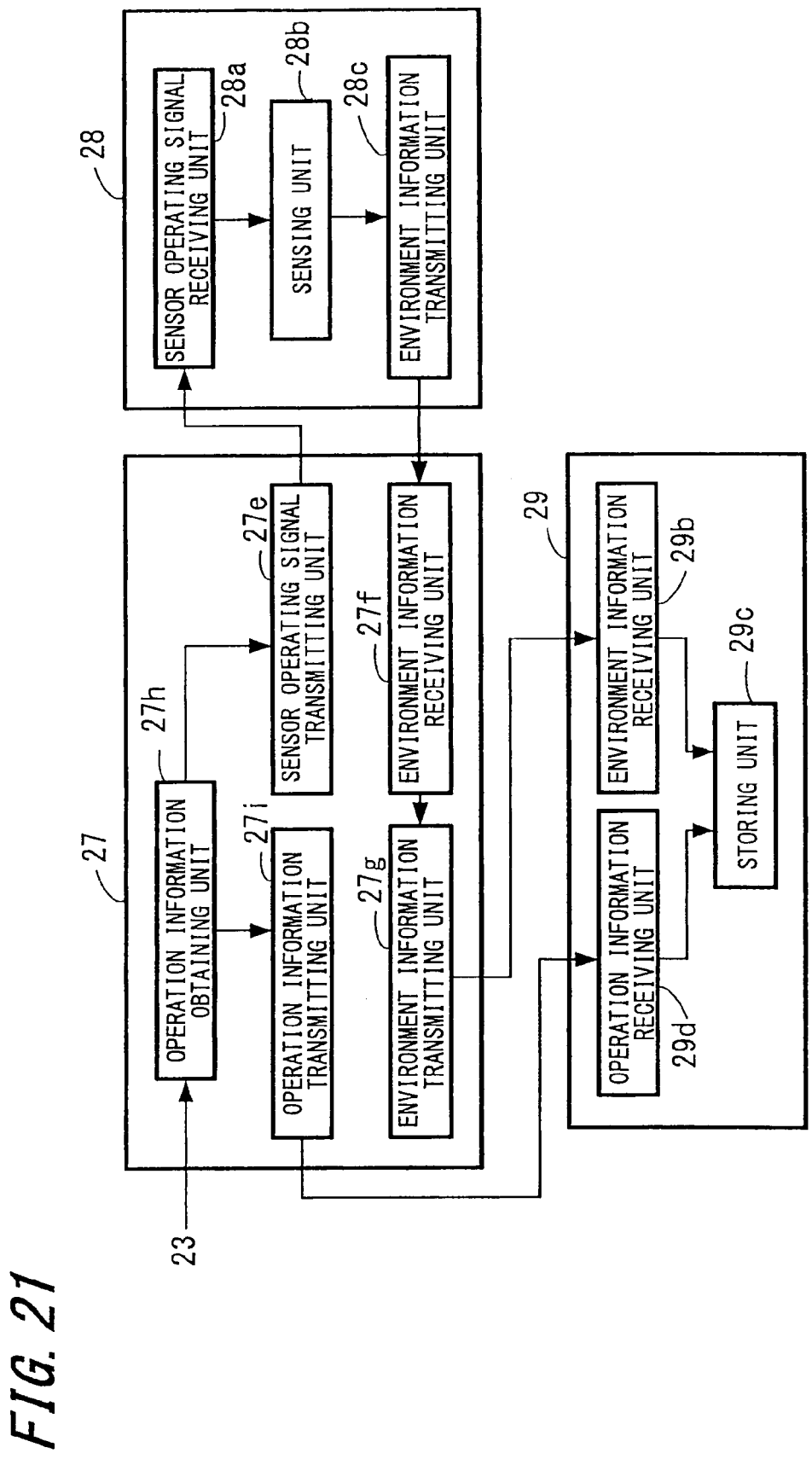
FIG. 21 is a block diagram showing the configurations of an obtaining apparatus, a sensor, and a (remote controller-side) storage apparatus.

FIG. 21 shows the configuration of an obtaining apparatus 27A, the sensor 28, and a storage apparatus 29A in this case. Since the sensor 28 and the storage apparatus 29A, have the same or substantially the same configurations as the sensor 28 and the storage apparatus 29 shown in FIG. 18, the following description will focus on the obtaining apparatus 27A. In FIG. 21, parts that correspond to FIG. 18 have been assigned the same reference numerals.

The obtaining apparatus 27A includes an operation information obtaining unit 27h, an operation information transmitting unit 27i, a sensor operating signal transmitting unit 27e, an environment information receiving unit 27f, and an environment information transmitting unit 27g.

Operation information including the adjustment values s, z is sent to the operation information obtaining unit 27h is sent from the remote control transmitter 23. The operation information obtaining unit 27h periodically obtains the adjustment values s, z when an adjustment operation is being carried out for the adjustment values s, z. The operation information transmitting unit 27i transmits the adjustment values s, z obtained by the operation information obtaining unit 27h to the storage apparatus 29A. Here, the adjustment values s, z obtained by the operation information obtaining unit 27h are appended with time information.

When the adjustment values s, z are obtained by the operation information obtaining unit 27h, the sensor operating signal transmitting unit 27e transmits the sensor operating signal to the sensor 28. The environment information receiving unit 27f and the environment information transmitting unit 279 are the same as the environment information transmitting unit 279 and the environment information transmitting unit 27g of the obtaining apparatus 27 shown in FIG. 18.

An operation information receiving unit 29d of the storage apparatus 29A receives the operation information sent from the obtaining apparatus 27A and sends the information to the storing unit 29c. The storing unit 29c stores the final adjustment values of series of adjustments to the adjustment values s, z and history information relating to the sequences of changes in the adjustment values up to the final adjustment values, based on the operation information received by the operation information receiving unit 29d, or in other words, based on the final adjustment values of series of adjustments to the adjustment values s, z and the sequences of changes up to the final adjustment values.

Figure 22:
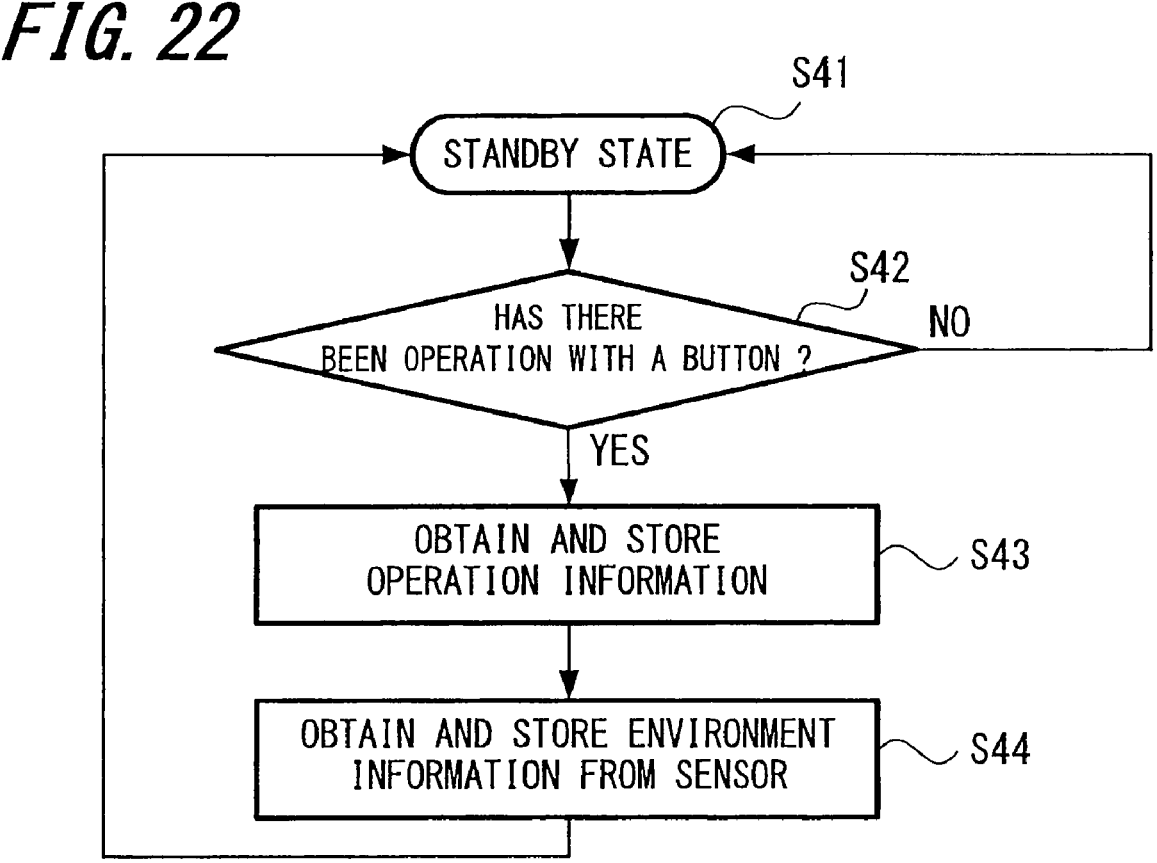
FIG. 22 is a flowchart showing the operation of a (remote controller-side) obtaining apparatus.

The operation of the obtaining apparatus 27A will now be described with reference to the flowchart in FIG. 22.

When the obtaining apparatus 27A is in the standby state in step S41, the processing periodically proceeds to step S42. In step S42, the operation information obtaining unit 27h determines, based on the operation information, whether an adjustment operation is being carried out. When an adjustment operation is not being carried out, the processing returns to the standby state in step S41. On the other hand, when an adjustment operation is being carried out, the processing proceeds to step S43.

In step S43, the operation information obtaining unit 27h obtains the adjustment values s, z included in the operation information and transmits the adjustment values s, z to the operation information transmitting unit 27i. In this case, the obtained adjustment values s, z are appended with time information. Further, when an adjustment operation is being carried out for the adjustment value s, the adjustment value s is obtained, while when an adjustment operation is being carried out for the adjustment value z, the adjustment value z is obtained. In addition, in step S43, the operation information transmitting unit 27i transmits the adjustment value s or the adjustment value z that has been obtained by the operation information obtaining unit 27h and sent to the operation information transmitting unit 27i to the storage apparatus 29A to store the value.

Subsequently, in step S44, the sensor operating signal transmitting unit 27e transmits the sensor operating signal to the sensor 28, the environment information receiving unit 27f receives the environment information sent from the sensor 28, and the environment information transmitting unit 27g transmits the environment information to the storage apparatus 29 to store the information. After step S44, the processing returns to the standby state in step S41.

When the user carries out adjustment of the adjustment values s, z using the remote control transmitter 23, the user adjusts the values s, z, based on the operation information that an adjustment operation is being carried out. Accordingly, in the obtaining apparatus 27A described earlier, the final adjustment values of the series of adjustments to the adjustment values s, z and the adjustment values in the sequences of changes up to the final adjustment values can be obtained and transmitted to the storage apparatus 29A.

In the embodiments described above, although an example is shown where the spatial resolution and the temporal resolution of images displayed according to an HD signal (a 1050i signal) obtained by the DRC circuit 18 are adjusted, the present invention can be applied in the same way to the adjustment of other aspects of image quality, such as noise reduction level, luminance, hue, and chroma saturation. The present invention can also be applied in the same way when the information signal is an audio signal. When the information signal is an audio signal, the output quality is audio quality, and therefore increases/decreases in treble or bass, noise reduction level, volume, and the like may be adjusted.

In addition, although an example has been described in the above embodiment where the environment information supplied to the DRC circuit 18 is the light information LI, the present invention is not limited thereto and the environment information may be noise information, viewing distance information, or information on viewing direction, time, electromagnetic state, or the like. In this case also, as disclosed in Japanese Unexamined Patent Application Publication No. 2005-94154, coefficient data $w_{i0}$ to $w_{i9}$ (where i=1 to n) corresponding to the environment state shown by such information is used to generate coefficient data Wi (where i=1 to n) of an estimation equation.

Use of the Obtained Information

Methods for using the various information obtained using an obtaining apparatus such as that described above will now be described. The using methods described below are a method of surveying users by carrying out tests or the like in advance, a method of mailing information obtained by users, and a method of sending information via a network.

5.(1) Method of Surveying Users in Advance

The obtained information, which includes the final adjustment value of a series of adjustments and history information relating to a sequence of changes to the adjustment value up to the final adjustment value, and environment information are mainly used by a manufacturer or the like of television receivers. The manufacturer employs arbitrary users for the testing, and can collect operation information of the users (one example of such apparatus is the television receiver 10), using an apparatus having functions as the preference data changing apparatus 2 and the sensor 4, thereby obtaining the final adjustment values, the history information, and the environment information for a series of adjustments by the users. At the same time, the manufacturer surveys the user's preferences (operation purpose, preferences, mood, and the like) during the series of adjustments and stores such information in the storage apparatus 29 or the HDD 25 of the television receiver 10. The CPU 14 of the television receiver 10 classifies the history information for each obtained final adjustment value and environment information into a number of patterns and links the classified history information patterns and stated preferences to create a database for the history information patterns and preference information for different users. The CPU 14 stores this database in the storage apparatus 29 or the HDD 25.

By using a method such as that described later, the manufacturer obtains history information for a series of adjustments to the same adjustment item as described above from a user whose preference has not been investigated, and stores the history information in the storage apparatus 29 or the HDD 25 of the television receiver 10. The CPU 14 analyzes the pattern of the history information of the user whose preference has not been investigated and collates whether the pattern resembles a history information pattern that has been recorded in the database described above. If a similar history information pattern exists, it is determined that the user whose preference has not been investigated belongs to the user group associated with the similar history information pattern in the database described above. Subsequently, the CPU 14 determines the preference of the user whose preference has not been investigated as the same as the preference of a user whose preference can be investigated and who belongs to the same group to thereby estimate the preference of the user whose preference has not been investigated. Note that the estimating processing for the preference of the user whose preference has not been investigated may be carried out by another computer instead of by the television receiver 10.

5.(2) Method of Mailing Information

By using an apparatus, such as the television receiver 10 that includes functions as the preference data changing apparatus 2 and the sensor 4 and can collect operation information for a user's final adjustment value, history information, and environment information of a series of adjustments by the user are obtained. Since the obtained information is stored in the storage apparatus 29 (29A), the user records in the removable medium 21. Here, the term "user" refers to someone whose preference during an adjustment operation can be investigated for a series of adjustments. Consequently, the user's preference when carrying out a series of adjustments is inputted and recorded in advance in the storage apparatus 29 (29A)c, and the obtained information is recorded together with the preference information in the removable medium 21*m* according to instructions for a graphical user interface (GUI), not shown. Subsequently, the user mails the removable medium 21 to the manufacturer or the like of the television receiver.

The manufacturer who has received the removable medium 21 in which the final adjustment value, the history information and the environment information have been recorded together with the preference information can use such information in the same way as described above to estimate the preferences during a series of operations of users whose preferences have not been investigated.

5.(3) Method Using a Network

By using the obtaining apparatus 27 and the sensor 28 connected to the television receiver 10 that includes the communication interface 30 shown in FIG. 15, the final adjustment value, history information, and environment information are obtained for a series of adjustments carried out by the user and are stored in the storage apparatus 29 (29A). At the same time, the user inputs his/her preference during the series of adjustments in accordance with instructions of a GUI, not shown to record such preference in the storage apparatus 29 (29A). The television receiver 10 transmits the obtained information stored in the storage apparatus 29 (29A) via the communication interface 30 to a server at the manufacturer that is connected to a network.

The manufacturer can obtain the final adjustment value, history information, environment information, and also the preference information via the network. The manufacturer can then use such information in the same way as described above to estimate the preferences during a series of operations of users whose preferences have not been investigated.

According to the method described above, a manufacturer who has obtained the final adjustment value, history information, environment information, and also the preference information for a series of adjustments by the user may also transmit a database (see FIG. 13) in which history information patterns for the series of adjustments by the user are associated with preference information via the network to the television receiver 10 shown in FIG. 1. In this case, the television receiver 10 stores the database in the HDD 25. Subsequently, when the user adjusts an arbitrary adjustment item, the CPU 14 of the television receiver 10 uses the history information relating to such adjustment to specify the user group to which the user belongs from the database and assist the user's adjustment operation based on the history information patterns of that user group. Thus, since the user can obtain the adjustment content and final adjustment value of users with a similar preference to himself/herself, it is possible to improve the accuracy of adjustments and to also stabilize the accuracy.

Information obtained in this way using the preference data changing apparatus and the sensor can also be utilized by an application having the final adjustment value of a series of adjustments. For example, in an information signal processing apparatus already disclosed by the present applicant for changing the resolution and the like of images in accordance with user preferences (see Japanese Unexamined Patent Application Publications Nos. 2002-022407, 2002-022409), the information can be used when using a final adjustment value to decide a suitable adjustment value (adjustment range) for the content of images. In this case, the final adjustment value, the history information, and the environment information for a series of adjustments carried out by the user are stored in a storage apparatus in association with the content of images during such adjustments.

Also, when determining an adjustment value in accordance with the content of images, it is possible to accurately decide an adjustment value that suits the user's preferences by determining a weighted average of a plurality of final adjustment values corresponding to the content of images based on a reliability value obtained from the history information and preference information. Accordingly, it is possible to determine an even more suitable adjustment value for the user's preferences by determining the adjustment value using only a suitable final adjustment value for the environment at that time.

According to the embodiment described above, it is possible to grasp the preferences of users in the context of the obtained information, and thereby evaluate the reliability of such information. in utilizing the obtained information, it is possible to provide highly accurate applications by clarifying how reliable the information is.

Also, when obtained information is collected and used in future research and development, it is possible to conduct studies using highly accurate information by clarifying how reliable the information is.

Note that the present invention is an apparatus which stores, when the user carries out adjustment to allow an output of an information signal to have a predetermined quality, not only the final adjustment value of a series of adjustments but also history information relating to the sequence of changes in the adjustment value up to the final adjustment value and also environment information for the user's surroundings on a storage medium, which means that the final adjustment value can be put to more effective use. Here, the present invention can be applied to an image display apparatus and an audio apparatus.

The present invention is not limited to the embodiment described above and it should be understood by those skilled in the art that various modifications, combinations, sub-combinations and alterations may occur depending on design requirements and other factors insofar as they are within the scope of the appended claims or the equivalents thereof.

What is claimed is:

1. An information signal processing apparatus comprising:
   an adjustment unit that receives a series of adjustments by which users each adjust an inputted information signal so that an output of the information signal has a predetermined quality;
   a preference estimating unit that requests preference information from each user during the adjustment of the inputted information signal, the preference information indicating a reason the user selected the series of adjustments; and
   a storage unit that stores in a storage medium operation information having a final adjustment value of the series of adjustments carried out by the adjustment unit and history information relating to a sequence of changes to an adjustment value up to the final adjustment value in association with the preference information.

2. The information signal processing apparatus according to claim 1, wherein preference information corresponding to operation information of users whose preferences during adjustments have not been collected are estimated by utilizing the operation information and the preference information of the users whose preferences during the adjustments have been collected and stored in the storage medium.

3. The information signal processing apparatus according to claim 2, wherein
   operation information of the users whose preferences during adjustment have been collected is classified into groups in accordance with characteristics thereof and stored in the storage medium, and
   the preference estimating unit specifies to which group operation information of the user whose preference during adjustment has not been collected belongs, and determines the preference information of the user whose preference during adjustment has not been collected as the same as preference information corresponding to operation information of the users whose preference during adjustment have been collected and who belong to the specified group.

4. The information signal processing apparatus according to claim 3, wherein the operation information of the users whose preferences during adjustments have been collected is classified into groups based on one or a combination of two or more of the following conditions:
   waveform of history information of the operation information; number of oscillations; magnitude of amplitude; manner of convergence; convergence time; speed of change; change frequency; operation time; and change over time of the waveform.

5. The information signal processing apparatus according to claim 1, wherein the storage unit obtains the final adjustment value and the history information from the adjustment unit.

6. The information signal processing apparatus according to claim 1, further comprising:
   a transmitting unit that allows adjustments by the adjustment unit to be remotely operated,
   wherein the storage unit obtains the final adjustment value and the history information from the transmitting unit.

7. The information signal processing apparatus according to claim 1, further comprising:
   an information obtaining unit that obtains environment information for the user's surroundings during the series of adjustments,
   wherein the storage unit appends the final adjustment value and the history information for the series of adjustments with the environment information, and stores the appended final adjustment value and history information in the storage medium.

8. A method of creating a database, comprising:
   receiving a series of adjustments by which users adjust an inputted information signal so that an output of the information signal has a predetermined quality;
   requesting preference information from each user during the adjustment of the inputted information signal, the preference information indicating a reason the user selected the series of adjustments; and
   storing, in a storage medium, operation information having a final adjustment value of the series of adjustments and history information relating to a sequence of changes to an adjustment value up to the final adjustment value in association with the preference information.

9. A method of processing an information signal, comprising:
   storing, in a storage medium, operation information including a final adjustment value of a series of adjustments carried out on an inputted information signal by a first user so that an output of the information signal has a predetermined quality, and history information relating to a sequence of changes in an adjustment value up to the final adjustment value, in association with preference information of the first user, the preference information being requested from the first user during the adjustment of the inputted information and indicating a reason the first user selected the series of adjustments;
   obtaining operation information including a final adjustment value of a series of adjustments carried out by a second user so that an output of the information signal has a predetermined quality, and history information relating to a sequence of changes in an adjustment value up to the final adjustment value; and
   estimating preference information corresponding to the operation information of the second user whose preference during the adjustments has been collected using the operation information and the preference information of the first user.

10. A non-transitory computer-readable medium storing computer-readable instructions thereon that when executed by a computer cause the computer to perform a method comprising:

storing, in a storage medium, operation information including a final adjustment value of a series of adjustments carried out on an inputted information signal by a first user so that an output of the information signal has a predetermined quality, and history information relating to a sequence of changes in an adjustment value up to the final adjustment value, in association with preference information of the first user, the preference information being requested from the first user during the adjustment of the inputted information and indicating a reason the first user selected the series of adjustments;

obtaining operation information including a final adjustment value of a series of adjustments carried out by a second user so that an output of the information signal has a predetermined quality, and history information relating to a sequence of changes in an adjustment value up to the final adjustment value; and estimating preference information corresponding to the operation information of the second user whose preference during the adjustments has been collected using the operation information and the preference information of the first user.

* * * * *